United States Patent
Fujiwara et al.

(10) Patent No.: US 6,755,574 B2
(45) Date of Patent: *Jun. 29, 2004

(54) OPTICAL CONNECTOR

(75) Inventors: Kunihiko Fujiwara, Sakura (JP); Yukio Hayashi, Sakura (JP); Yoshikazu Nomura, Sakura (JP); Hiroshi Yokosuka, Sakura (JP); Masaaki Takaya, Mito (JP); Shinji Nagasawa, Mito (JP)

(73) Assignee: Fujikura Ltd. and Nippon Telegraph and Telephone Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/171,748

(22) Filed: Jun. 17, 2002

(65) Prior Publication Data

US 2002/0150347 A1 Oct. 17, 2002

Related U.S. Application Data

(62) Division of application No. 09/529,982, filed as application No. PCT/JP98/04798 on Oct. 23, 1998, now Pat. No. 6,425,692.

(30) Foreign Application Priority Data

| Oct. 23, 1997 | (JP) | 9-291396 |
| Oct. 23, 1997 | (JP) | 9-291397 |
| Oct. 23, 1997 | (JP) | 9-291398 |
| Oct. 23, 1997 | (JP) | 9-291400 |
| Oct. 23, 1997 | (JP) | 9-291401 |
| Oct. 23, 1997 | (JP) | 9-291402 |
| Dec. 22, 1997 | (JP) | 9-353740 |
| Feb. 27, 1998 | (JP) | 10-048235 |

(51) Int. Cl.⁷ .............................................. G02B 6/36

(52) U.S. Cl. .................... 385/56; 385/53; 385/55; 385/76

(58) Field of Search .............................. 385/53–58, 60, 385/62, 63, 69, 70, 72, 75, 76, 81, 92, 139

(56) References Cited

U.S. PATENT DOCUMENTS 5,138,680 A * 8/1992 Briggs et al. .................. 385/90

(List continued on next page.)

FOREIGN PATENT DOCUMENTS

JP    Sho 55-35546    8/1980

(List continued on next page.)

OTHER PUBLICATIONS

Hayashi, Y., et al., "Development of Backpanel Type Multifiber Connector", *English Abstract of a collection of works for lectures in the Communication Society Congress, Institute of Electronics, Information and Communication Engineers*, pp. 481 (Aug. 30, 1996).

*Primary Examiner*—Brian Healy
*Assistant Examiner*—Kevin S Wood
(74) *Attorney, Agent, or Firm*—Burns, Doane, Swecker & Mathis, LLP

(57) ABSTRACT

An optical connector that provides a housing body 21 and a fixed part 22 that are installed so as to hold a backplane 3, and connects an optical connector plug 4b inserted into said housing body 21 via an installation hole in said backplane 3 and another optical connector plug 4a inserted into said housing body 21 from the direction opposite to that of said optical connector plug 4b, wherein flexible claws 25 projecting from both sides of said fixed part 22 engage said housing body 21 via said installation hole 30 in said backplane 3, and thereby said backplane 3 is held between said housing body 21 and said fixed part 22. Simply by adjusting the floating range (amount of floating) of the flexible claws 25 within said installation hole 30 the floating range (amount of floating) of the housing body 21 can be reliably set. Thereby, when the housing body 2 engages the printed board housing, the dimensional error is offset reliably by the floating of the housing body 21, and the engagement is carried out smoothly. A special order part for setting the floating range of the housing body 21 is not necessary, and thus a lower cost is possible and assembly can be carried out easily. In addition, a structure can also be used wherein the flexible claws projecting from the housing body side engage the backplane by passing through the installation hole, and the backplane is held between the bearing walls on the side of the housing body.

6 Claims, 41 Drawing Sheets

U.S. PATENT DOCUMENTS

| | | | | |
|---|---|---|---|---|
| 5,600,746 A | * | 2/1997 | Arnett | 385/53 |
| 5,719,977 A | * | 2/1998 | Lampert et al. | 385/60 |
| 5,956,444 A | * | 9/1999 | Duda et al. | 385/53 |
| 6,188,827 B1 | * | 2/2001 | Stephenson | 385/140 |
| 6,425,692 B1 | | 7/2002 | Fujiwara et al. | |

FOREIGN PATENT DOCUMENTS

| | | |
|---|---|---|
| JP | 02-040873 | 2/1990 |
| JP | 02-135305 | 5/1990 |
| JP | Hei 7-46884 | 10/1995 |

* cited by examiner

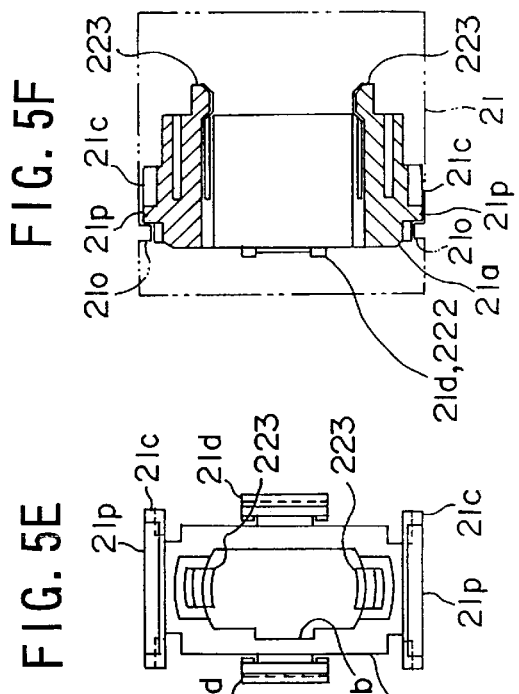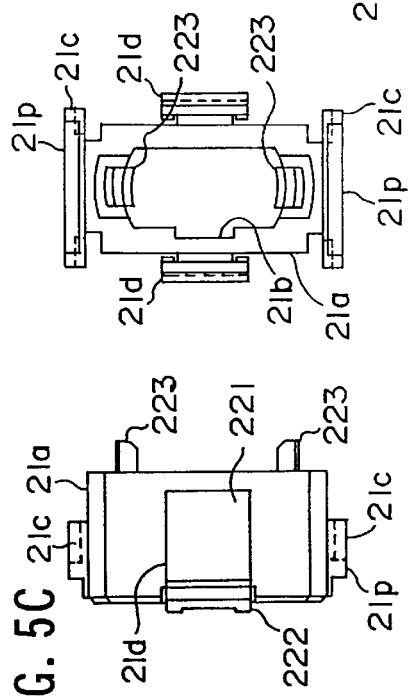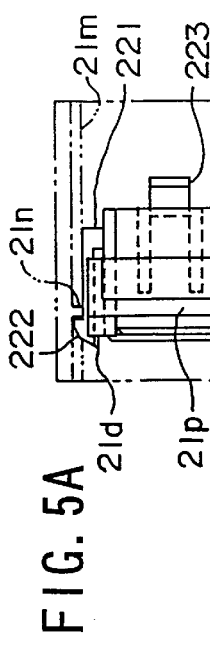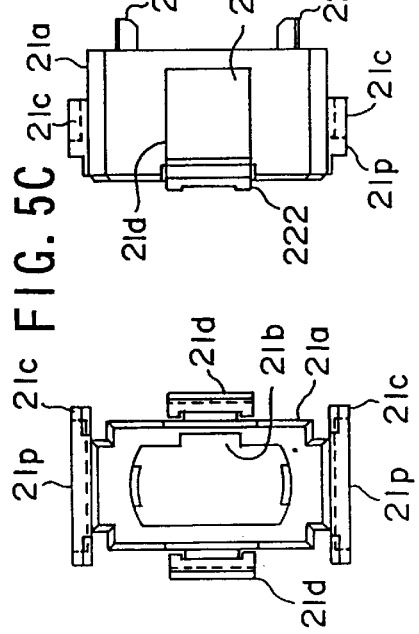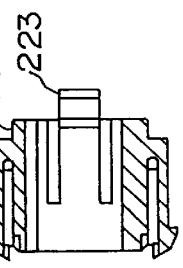

FIG. 21
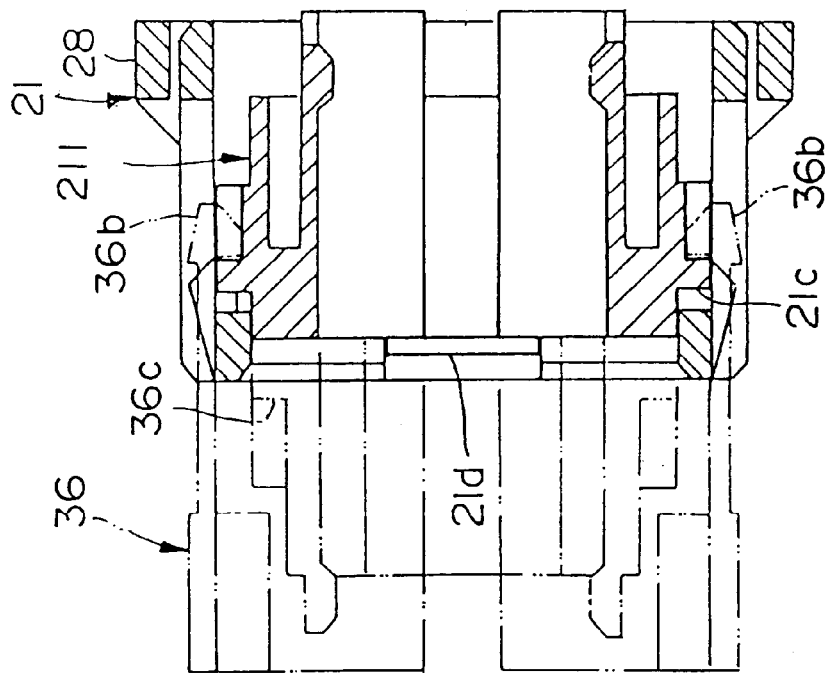
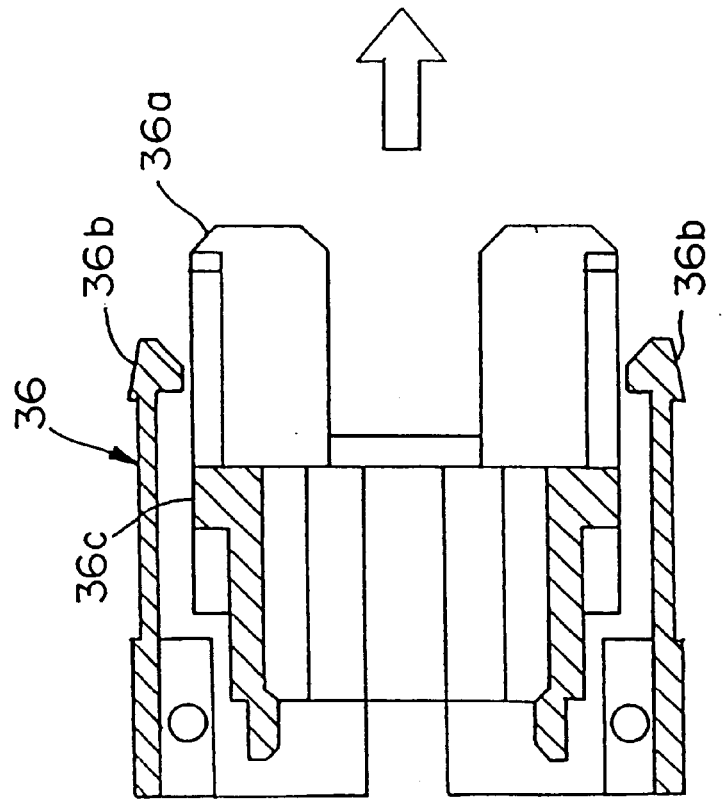

OPTICAL CONNECTOR

This application is a divisional of Application Ser. No. 09/529,982, filed on Apr. 24, 2000 now U.S. Pat. No. 6,425,692, which was a national stage filing under 35 U.S.C. §371 of International Application No. PCT/JP98/04798 filed on Oct. 23, 1998, which International Application was published by the International Bureau in English on Apr. 29, 1999; which in turn claims priority to Japanese Serial 09-291396, filed Oct. 23, 1997; which in turn claims priority to Japanese Serial No. 09-291397 filed on Oct. 23, 1997; which in turn claims priority to Japanese Serial No. 09-291398 filed on Oct. 23, 1997; which in turn claims priority to Japanese Serial No. 09-291400 filed on Oct. 23, 1997; which in turn claims priority to Japanese Serial No. 09-291401 filed on Oct. 23, 1997; which in turn claims priority to Japanese Serial No. 09-291402 filed on Dec. 22, 1997; which in turn claims priority to Japanese Serial No. 09-353740 filed on Feb. 27, 1998; which in turn claims Japanese Serial No. 10-048235 filed Feb. 27, 1998; which in turn claims PCT Serial No. PCT/JP98/04798.

BACKGROUND OF THE INVENTION

1. Field of the Invention

The present invention relates to an optical connector, and in particular to an optical connector that connects together optical connector plugs inserted from the front and back of a backplane in a housing body installed by using an installation hole in the backplane of a plug-in unit, for example.

2. Description of the Related Art

What is termed a backplane connector (referred to hereinbelow as a "BP connector") is a plug-in type optical connector that connects optical connector plugs inserted into both the front and back of a backplane using a backplane housing (hereinbelow, a "BH housing") assembled using an installation hole in the backplane of a plug-in unit, for example.

FIG. 46 is an example of this BP connector.

In FIG. 46, reference numeral 1 is a plug-in unit, reference numeral 2 is a printed board, reference numeral 3 is a backplane, reference numerals 4a and 4b are connector plugs (hereinbelow, "MPO plugs"), reference numeral 5 is a printed board housing (hereinbelow, "PH housing"), and reference numeral 6 is a BH housing.

The MPO connectors 4a and 4b are optical connectors specified in JIS C 5982 and IEC 1754-7, and having a structure that supports an optical connector ferrule 4c, whose end has been PC (Physical Contact) polished, in a plastic housing.

This BP connector is assembled by engaging a PH housing 5 in a BH housing 6 installed in a backplane on the side of a plug-in unit 1 by inserting a printed board 2 that anchors the PH housing 5 to the plug-in unit 1. The engaged PH housing 5 and the BH housing 6 form the optical connector adapter 7, and connect the MPO plugs 4a and 4b inserted from both sides. The MPO plug 4a, inserted into the optical adapter 7 from the PH housing 5, is inserted in advance into the PH housing 5, and at the same time that the printed board 2 is inserted into the plug-in unit 1, the optical connector adapter 7 is inserted. On the plug-in unit 1, a plurality of printed boards 2 can be accommodated in parallel at a high packing density, and thus high-density packing of optical connector adapters 7 is possible with this BP connector FIG. 47 is an exploded perspective drawing showing the BH housing 6.

As shown in FIG. 47, the BH housing 6 provides a housing body 8 and a backside housing 9 that are disposed opposite each other via the backplane 3. The housing 8 is disposed on the printed board 2 side (the left side in FIG. 7), and the backside housing 9 is disposed at a position facing the housing body 8 via the backplane 3. Pins 10 project from the housing body 8, pass through to the opposite side of the backplane 3 by being inserted through the installation hole 11 in the backplane 3, and anchor the backside housing 9 to the protruding ends of the pins 10 by screws 12.

FIG. 48 shows the installation hole 11.

As shown in FIG. 8, the installation hole 11 is rectangular, and has an extended part 13 in the four corners. The pins 10 are accommodated in the opposing pairs of extended parts 13 and 13 along the diagonal (omitted from figure) of the installation holes 11, and furthermore, in the vertical direction (top to bottom in FIG. 48), a gap 14 of approximately a=1.60 mm is maintained, and in the horizontal direction (left to right in FIG. 48), a gap 15 of approximately b=0.34 mm is maintained. The housing body 8 and the backside housing 9 slidably hold the backplane 3, and thus the BH housing 6 can float within the range of movement of the pins 10 and 10 in the gaps 14, 15. Thereby, as shown in FIG. 46, when the PH housing 5 is engaged in the BH housing 6 the size discrepancy is offset by the floating of the BH housing 6, and thus the engagement operability is improved.

Specifically, in the abutment connection between the optical connector ferrules 4c, 4d defined in JIS C 5981, one optical connector ferrule 4c is engaged in advance, the guide pins 4p projecting from the junction end are inserted and engaged in the guide pin holes 4q bored into the other optical connector ferrule 4c, and thereby precisely positioned. When the PH housing 5 has been properly engaged, the guide pins 4p can be smoothly engaged in the guide pin holes 4q due to the floating of the BH housing 6.

However, in the case of this BP connector, the dimension of the screw 12 diameter is about 1.2 mm, labor is involved in anchoring the backside housing 9 with a hand tool, and thus its operability is not satisfactory. In particular, when applying this BP connector to the wall of a building, etc., there are many cases in which an adequate work space cannot be secured, and this problem of operability becomes even more serious. In addition, because the screw 12 itself is a special order item, cost reductions are difficult, and at the same time, because the pin 10 and screw hole 16 (refer to FIG. 47) are formed conforming to the screw 12, there is the problem that labor is involved in their manufacture. Furthermore, because the installation hole 11 formed in the backplane 3 acquires a complicated shape corresponding to the screws 12, there is the problem that labor is involved in the formation of this installation hole 11. If the floating range of the BH housing 6 is too big or too small, ensuring the engagement of the PH housing 5 is difficult, and thus even more care is required in the formation of the screw 12, the pin 10, and the installation hole 11, which involves labor.

SUMMARY OF THE INVENTION

In consideration of the above, it is an object of the present invention to provide an optical connector that can be assembled simply, and furthermore does not require screws for anchoring, and makes possible the reduction of cost by reducing the number of parts by engaging flexible claws projecting from an anchoring part disposed opposite a housing body via the backplane in this housing body via an installation hole in this backplane, or engaging flexible claws projecting from an installation part attached to the outside of the housing body on this backplane via the installation hole.

The present invention is an optical connector providing a housing body and a fixed part that are disposed on opposite sides of the backplane, and installed so as to hold this backplane, and via an installation hole in the backplane, connect an optical connector plug inserted in the housing body and a separate optical connector plug inserted into the housing body from the direction opposite to this optical connector plug, and wherein this fixed part provides a plug insertion hole in which this optical connector plug is inserted, and flexible claws that engage by being disposed on opposite sides of the plug insertion hole and then inserted into the housing body. These flexible claws are installed so that the housing body and the fixed part hold the backplane by being engaged in the housing body via the installation hole in the backplane. In addition, the plug insertion hole communicates with the installation hole and the housing body to form a means to solve the above-described problems.

This optical connector is installed by holding the backplane between the housing body and the fixed part by engaging the flexible claws of the fixed part in the housing body via an installation hole in the backplane. In addition, the flexible claws can be structured so as to be detachable from the housing body, and thereby the removal operability is improved.

For example, as disclosed in the description of related art, in consideration of the structure in which a printed board housing attached to a printed board inserted in a plug-in unit is engaged in a housing body, the housing body is allowed to float. When the desired floating range is reliably attained for the housing body, the misalignment can be offset by the floating range of the housing body when the print port housing is engaged in the housing body, and thus the engagement operability is improved.

Thus, in the present invention, in order to attain reliably the desired floating range for the housing body, as recited in claim 2, a structure is generally adopted that permits displacement of the flexible claw in the installation hole by securing a clearance in the vicinity of the flexible claws inserted in the installation hole by a structure wherein the flexible claws of the fixed part passe through the installation hole in the backplane and is engaged in the housing body. According to this structure, the housing body and the fixed part, which are assembled by enclosing the backplane by the engagement of the flexible claw, form a backplane housing that can integrally float within the range of movement of the flexible claw in the installation hole. Therefore, by simply setting the range of movement of the flexible claw in the installation hole, the amount of floating of the backplane housing can be easily set, and the desired floating range or amount of floating in the housing body can be reliably attained. Thereby, in order to set the floating range or amount of floating of the housing body, it is unnecessary to prepare separately a special order part, and the cost can be reduced.

In addition, with the present invention, a structure can also be used wherein the housing body is supported at the desired position in the backplane by the pair of flexible claws, projecting from the installation part mounted and anchored outside the housing body, engaging the backplane on both sides of this engaging hole by passing them through the installation hole in the backplane, and holding the backplane between the pair of flexible claws and the supporting wall provided on the installation part.

In this structure, the backplane housing that comprises the housing body and the installation part is supported by both the outside and inside of the backplane. Moreover, due to the clearance guaranteed in the vicinity of the flexible claws inserted in the installation hole, the point that the desired floating range and the amount of floating of the housing can be easily and reliably attained, and the point that the desired floating range and amount of floating can be set without special order parts, are the same as described above.

Moreover, below, backplane connector is abbreviated "BP connector", backplane housing is abbreviated "BH housing", and printed board housing is abbreviated "PH housing".

BRIEF EXPLANATION OF THE DRAWINGS

FIG. 5A is a planar drawing showing the internal housing;

FIG. 5B is a frontal drawing (the PH housing side) showing the internal housing;

FIG. 5C is a side drawing showing the internal housing;

FIG. 5D is a plane cross-section showing the internal housing;

FIG. 5E is a back view (the backplane side) showing the internal housing; and

FIG. 5F is a side cross-sectional drawing showing the internal housing.

FIG. 21 is a side cross-sectional drawing showing the operation of the engagement of the PH housing and the BH housing in FIG. 16.

PREFERRED EMBODIMENTS OF THE INVENTION

Below, the first embodiment of the optical connector of the present invention is explained referring to the figures.

Figure 1:
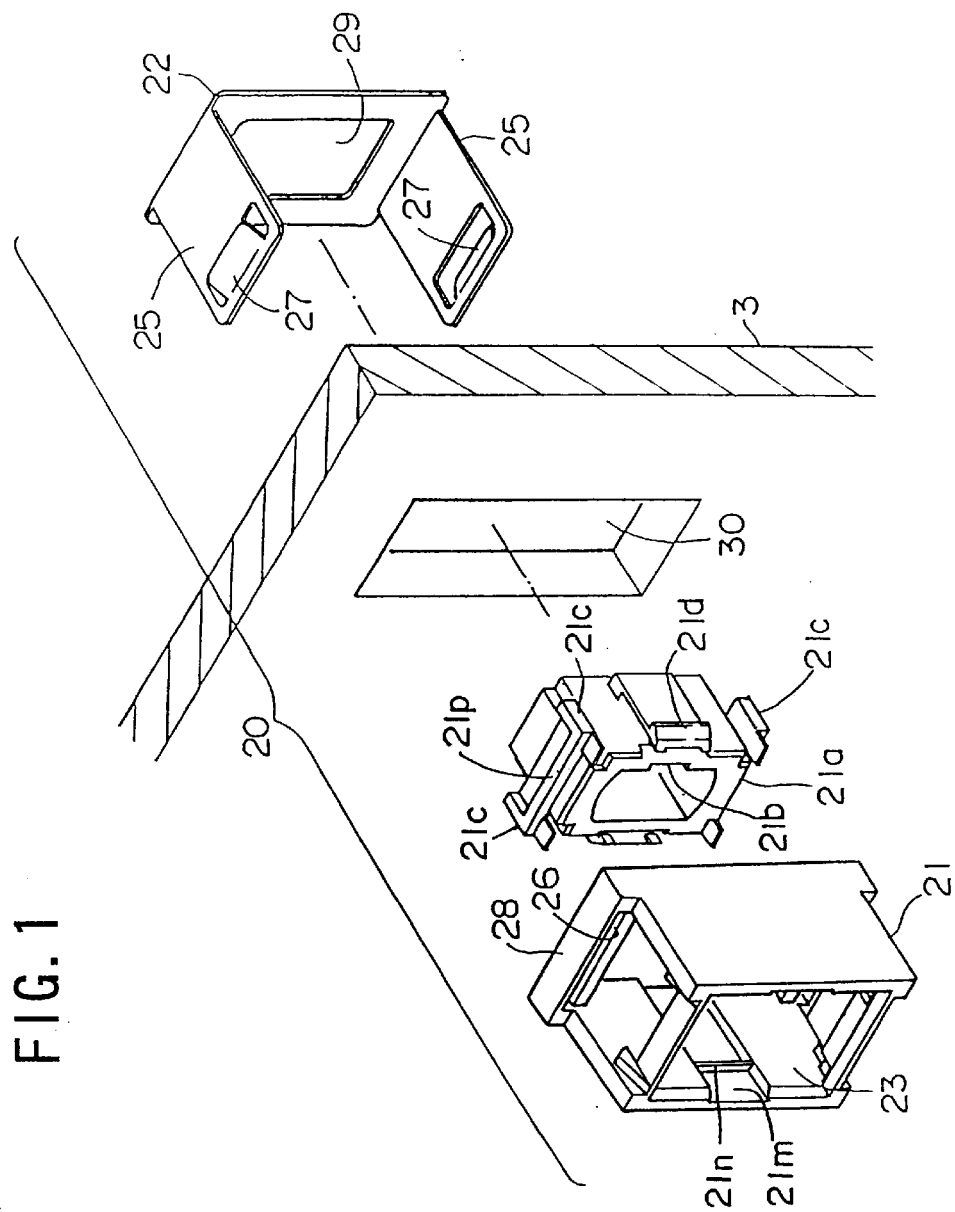
FIG. 1 shows the first embodiment of the optical connector of the present invention, and is an exploded perspective drawing showing the BH housing.
Figure 2:
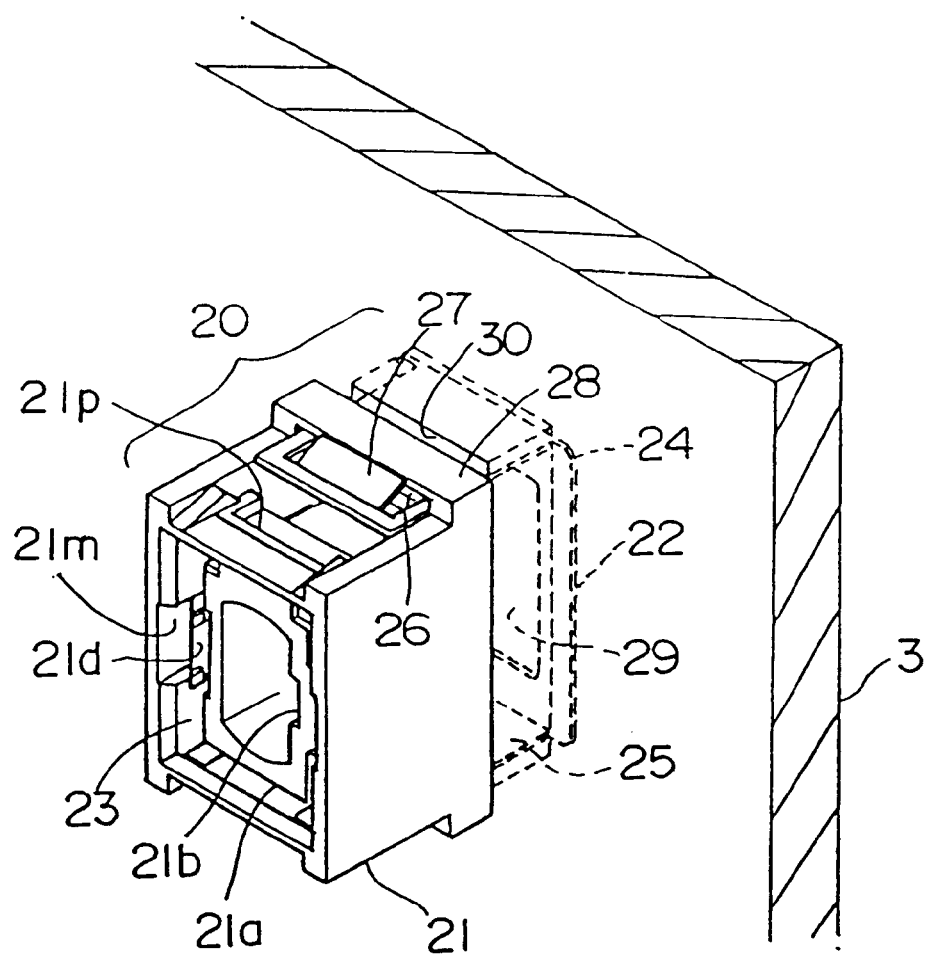
FIG. 2 is a perspective drawing showing the assembled state of the BH housing in FIG. 1.

The optical connector (BP connector) shown in FIG. 1 and FIG. 2 comprises the BH housing shown by reference numeral 20 in FIG. 1 and FIG. 2. This BH housing 20 forms an optical connector adapter that connects together the MPO plugs 4a and 4b (corresponding to the optical connector plug recited in claim 1) inserted from both sides by engaging the PH housing 5 shown in FIG. 46.

Figure 46:
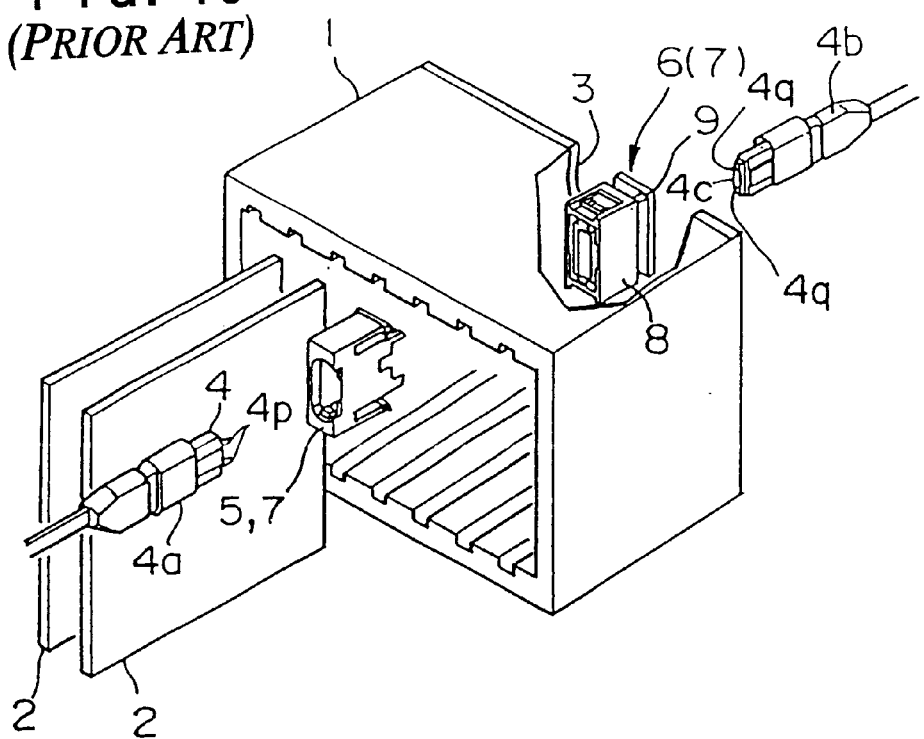
FIG. 46 is an exploded perspective drawing showing the BP connector in the background art of the present invention.
Figure 47:
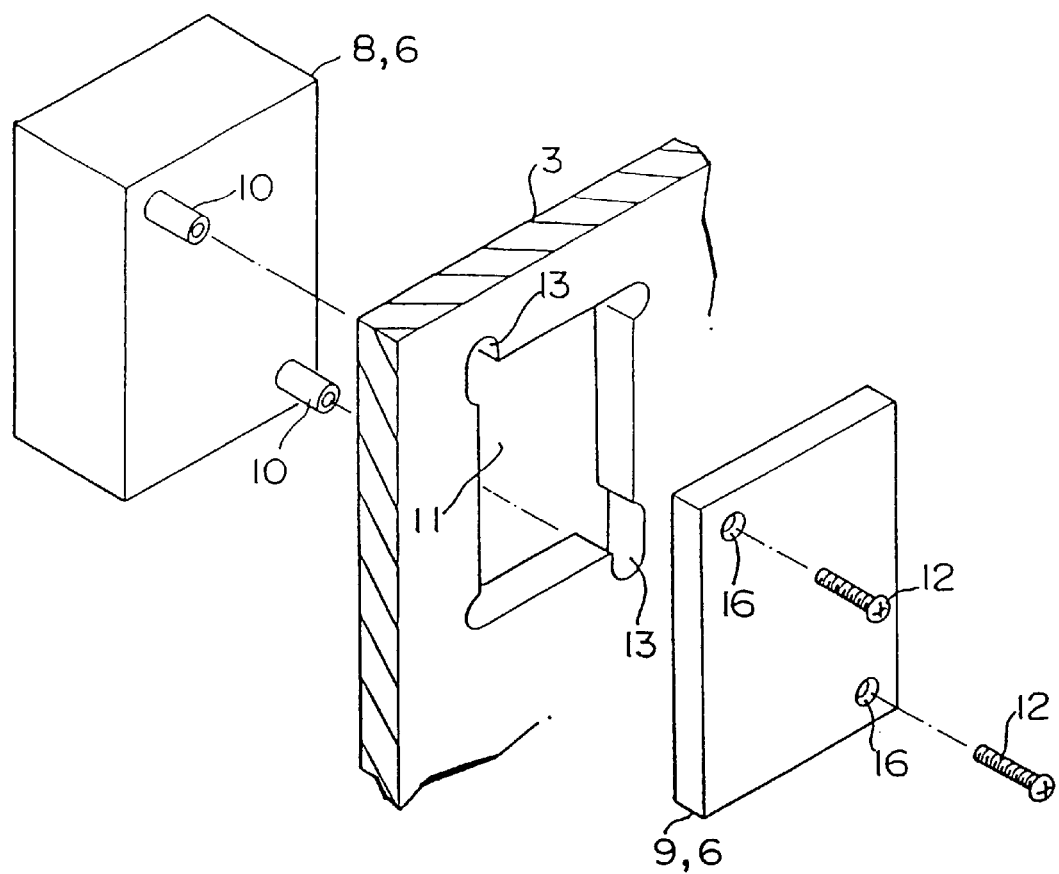
FIG. 47 is an exploded perspective drawing showing the BH housing of the BP connector in FIG. 46.
Figure 48:
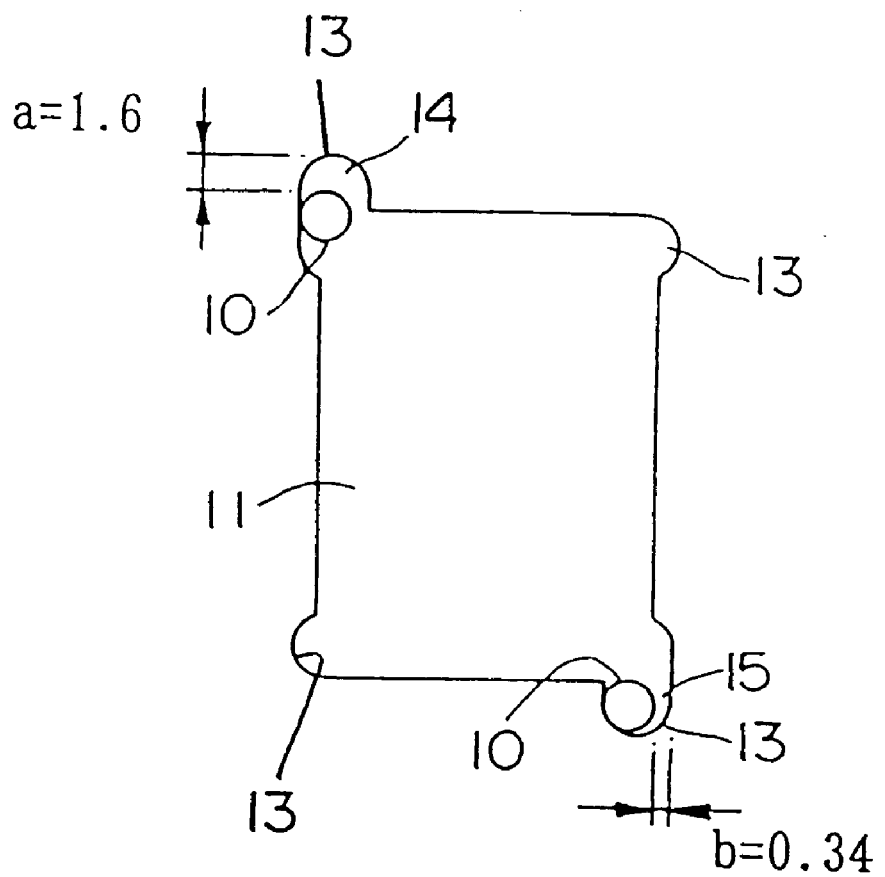
FIG. 48 is a front view showing the installation hole of the BP connector in FIG. 46.

Moreover, structural components identical to those of FIG. 46 to FIG. 48 have the identical reference numerals, and the explanation of these has been omitted.

As shown in FIG. 1 and FIG. 2, the BH housing 20 provides a housing body 21 and a fixed part 22 (or a fixed metal fitting).

As shown in FIG. 1, the housing body 21 is formed as a square sleeve from a synthetic resin such as plastic, and provides a plug accommodation hole 23 that accommodates the inserted MPO plugs 4a and 4b. In the plug accommodation hole 23, the internal housing 21a is accommodated, and the internal housing 21a positions the MPO plugs 4a and 4b connected therein so as to be able to form an abutment connection through the key groove 21b. Moreover, the internal housing 21a is accommodated by allowing a slight floating in the axial direction of the housing body 21, but is precisely positioned in all other directions. In addition, even during the process of accommodation in the housing body 21, the internal housing 21a is structured so as to be able to move in the axial direction of the housing body 21. This will be described in detail below.

The fixed part 22 is formed entirely from an flexible material, and has a C-shape providing a frame-shaped body 24 and a pair of flexible claws 25 and 25 that project form both sides of the body. The projection positions of the flexible claws 25 and 25 conform to the pair of long rectangular engaging holes 26 and 26 formed on both sides (vertically in the figure) opposite to the housing body 21 (an engaging hole 26 is also on the lower side of the housing body 21 shown in FIG. 1 and FIG. 2). In addition, an engaging claw 27 projects from the ends of the flexible claws 25 and 25. In FIG. 2, the engaging claws 25 and 25 are inserted through the installation hole 30 in the backplane 3, respectively inserted into the engaging holes 26 and 26 of the housing body 21 disposed on opposite sides via the backplane 3, and engage the engaging claws 27 at the engaging parts 28 and 28 of the housing body 21.

Figure 3:
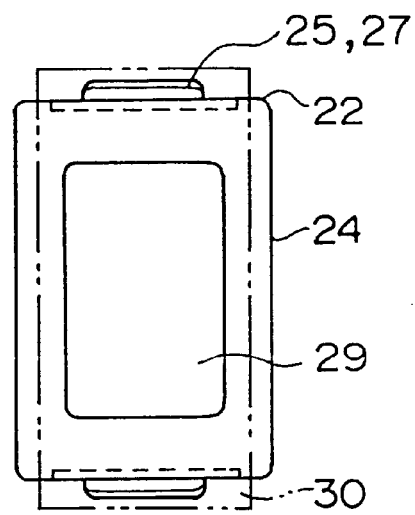
FIG. 3 is a frontal drawing showing the installation hole with the BH housing of FIG. 1 installed.

As shown in FIG. 3, the installation hole 30 is rectangular, and extends in the form of a slit in the backplane 3. The dimension of the lateral width (in the horizontal direction in the figure) of the body 24 of the fixed part 22 is at least larger than the lateral width of the installation hole 30, and the plug insertion hole 29 at the center of the body 24 is smaller than the insertion hole 30. Furthermore, the lateral width of both flexible claws 25 and 25 is smaller than the lateral width of both installation holes 26 and 26. As shown in FIG. 2, in the assembled BH housing 20, the backplane 3 is gently held between the housing body 21 and the body 24 by a clamping force that allows sliding.

Figure 4:
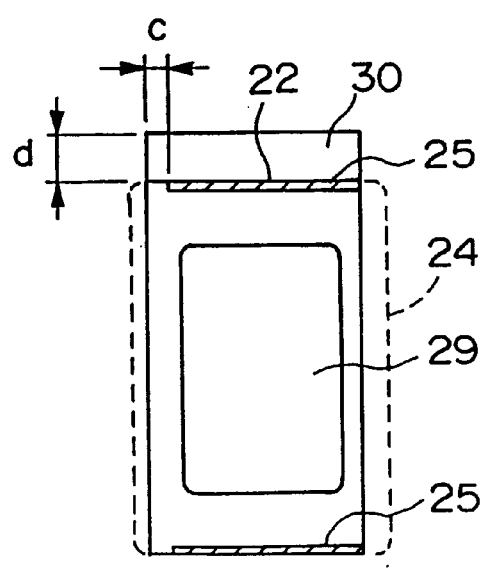
FIG. 4 is a frontal drawing showing the clearance that is guaranteed in the vicinity of the flexible claws in the installation hole of FIG. 3.

As a result, as shown in FIG. 3, a clearance is guaranteed in the vicinity of the flexible claws 25 and 25 inserted into the installation hole 30, and within the installation hole 30, deformation of the flexible claws 25 and 25 and movement of position is allowed within the range of this clearance. Therefore, on the BH housing 20 installed in the backplane 3, floating of the flexible claws 25 and 25 within the range of movement in the installation hole 30 is allowed. For example, as shown in FIG. 4, this clearance is guaranteed to be c=0.34 mm in the horizontal direction (left to right in FIG. 4) and d=1.60 mm in the vertical direction (top to bottom in FIG. 4), and within the range of this clearance, the flexible claws 25 and 25 can shift, and the range of floating and the amount of movement with respect to the backplane 3 of the BH housing 20 can be set. Thereby, when the printed board 2 is inserted into the plug-in unit 1 (refer to FIG. 46) and the PH housing 5 is engaged in the BH housing 20, even when the positioning between the PH housing 5 and the BH housing 20 is misaligned, by forcibly pressing the PH housing towards 5 the BH housing 20, the PH housing 5 will engage the BH housing 20. That is, the misalignment of these housings 5 and 20 is offset by the floating of the BH housing 20, and thus the engagement operability is improved. Thereby, in the case that both MPO plugs 4a and 4b are connected at the same time the PH housing 5 and the BH housing 20 are engaged, the operation of inserting and engaging the guide pin 4p of one optical connector ferrule 4c into the guide pin hole of the other optical connector ferrule 4c also can be carried out smoothly.

In assembling this BH housing 20 in the backplane 3, the housing body 21 is disposed adjacent to the desired installation hole 30 at the inside of the plug-in unit 1 (refer to FIG. 46), and the flexible claws 25 and 25 of the fixed part 22 are inserted into the engaging holes 26 and 26 of the housing body 21 through the installation hole 30 from the outside of the plug-in unit 1 (further to the right than the backplane in FIG. 1). The engaging holes 26 and 26 form a vertical slit having a narrow longitudinal width (the top to bottom direction on the surface of the page). The width (longitudinal width) of this slit is larger than the thickness of the flexible claws 25, and in addition, is smaller than the sum of the height of the flexible claw 25 and the engaging claw 27. The transverse width of the slit is larger than the transverse width of the flexible claw 25. Thus, when the flexible claw 25 is inserted into the engaging hole 26, the engaging claw 27 abuts the engaging hole 26. That is, the engaging claw 27 is a cantilever-type flexible body made by stamping and bending the end of the flexible claw 25, and when forcibly inserted into the engaging hole 26, is flexibly deformed by the engaging hole 26 by gradually bending. Furthermore, when inserted, the engaging claw 27 passes through the engaging hole 26, and is restored to its original shape by its elasticity. When the shape of the engaging claw 27 is restored after passing through the engaging hole 26, the free end of the engaging claw 27 engages with one part of the BH housing on the upper side of the engaging hole 26. Thereby, the extraction of the flexible claw 25 from the engaging hole 30 is restricted, and the integration of the fixed part 22 and the BH housing 20 is complete.

Therefore, the operation of mounting this BH housing 20 into the backplane 2 comprises simply pressing the fixed part 22 into the housing body 21, and thus in comparison to anchoring using pins, the operability is improved. In addition, in contrast to the anchoring by a pin, which requires a work space for the screw anchoring, the work space is reduced because only a space sufficient for a hand to enter in order to press the fixed part 22 needs to be secured, and this is advantageous in the case of carrying out this work on the wall of a building, etc. With this optical connector, the BH housing 20 can also be assembled by pressing the housing body 21 into the fixed part 22, which has been anchored in advance, and in this case, it is not necessary to secure a work space outside the plug-in unit.

In addition, simply by adjusting the shape of the flexible claws 25 and 25, the clearance in the vicinity of the flexible claws 25 and 25 inserted in the installation hole 30 can be easily adjusted, and thus the floating range of the BH housing 20 can be easily set. Thereby, because the shape of the installation hole 30 can be simple and the required precision can be eased, the formation operability can be improved.

Furthermore, there is also the effect that the cost can be reduced since the number of parts is reduced because pins are not used.

Next, the structure of the internal housing 21a will be explained.

The internal housing 21a is an integral part formed by a resin mold, and as shown in FIG. 1, the engaging claws 21d on both sides of the internal housing 21a are inserted into the engaging groove 21m on both sides inside the housing body 21. As shown in FIG. 5A to FIG. 5E, the engaging claws 21d are flexible claws providing an engaging end 222 on the end of the L-shaped arm part 221 projecting from both sides of the internal housing 21a. In addition, as shown in FIG. 5A, this internal housing 21a is inserted into the housing body 21 from the backplane 3 side (the right side in FIG. 5A), and thereby the engaging claws 21d that move along the engaging grooves 21m in the direction of the PH housing 5 (the left side in FIG. 5A) engage the engaging projection 21n projecting in the engaging groove 21m (specifically, the engaging end 222 is engaged by being hooked). Thereby, the internal housing 21a is stopped temporarily in the housing body 21, and the movement of the internal housing 21a in the direction of the backplane 3 is restricted. That is, even when the internal housing 21a is pressed from the left side to the right side in the figure, the internal housing 21a is not separated from the housing body 21, and the engagement with the engaging projection 21n is not easily released. Meanwhile, when pressed from the right to the left side in the figure, as shown in FIG. 5F, the separate external projections 21p projecting on both the top and bottom sides of the internal housing 21a (top to bottom in FIG. 5F) are abutted so as to contact the restricting projection 21o projecting on the inner surface of the housing body 21, and thereby the internal housing 21a is not moved any further in the direction of the PH housing 5 (the left side of FIG. 5A). In this manner, the internal housing 21a is temporarily stopped, and in the left to right direction in the figure, slight movement is possible between the engaging projection 21n and the restricting projection 21o. Moreover, the positioning projection 21c that extends along the side surface of the internal housing 21a from the external projection 21p slides along with the wall inside the housing body 21, and misalignment of the internal housing 21a in any direction other then the axial direction of the housing body 21 is prevented.

Figure 6A:
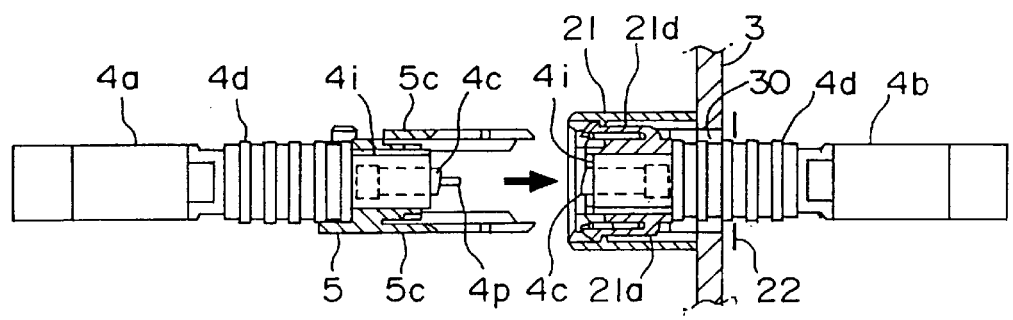
FIG. 6A is a planar cross-sectional drawing showing the PH housing before engaging the BH housing.
Figure 6B:
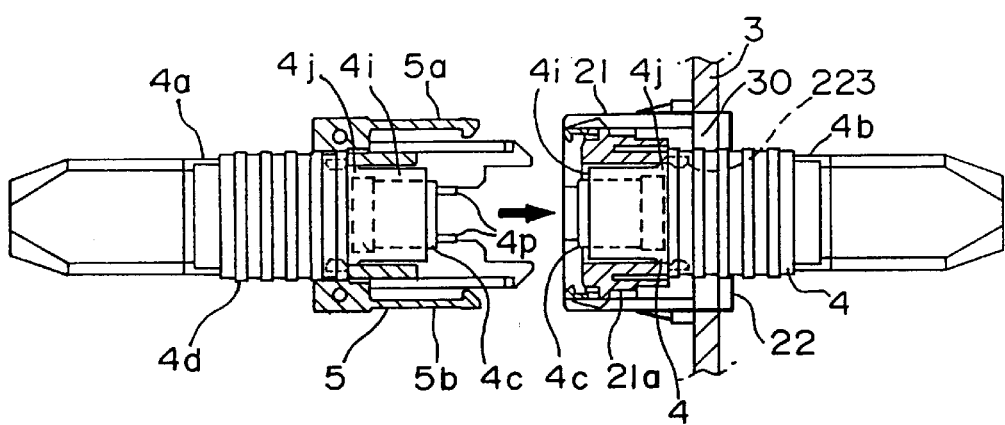
FIG. 6B is a side cross-sectional drawing of the same.

The lock projection 223 projecting on the side of the backplane 3 of the internal housing 21a, as shown in FIG. 6B, is engaged detachably with the engaging part 4j formed on the housing 4i of the MPO plug 4b inserted into this internal housing 21a.

As shown in FIGS. 6A and 6B, when the MPO plug 4b is inserted into the internal housing 21a via the installation hole 30 of the backplane 30, the end of the coupling 4d of the MPO plug 4b abuts the end of the backplane 3 side of the internal housing 21a. By pressing further, when the housing 4i reaches its sliding limit with respect to the coupling 4d, pressing of the housing 4i any further is restricted. In addition, by the lock projection 223 of the internal housing being detachably engaged in the engaging part 4j of the housing 4i of the MPO plug 4b, the MPO plug 4b is detachably fastened.

Next, the connection between the MPO plugs 4a and 4b in this BP connector will be explained in detail.

Figure 7A:
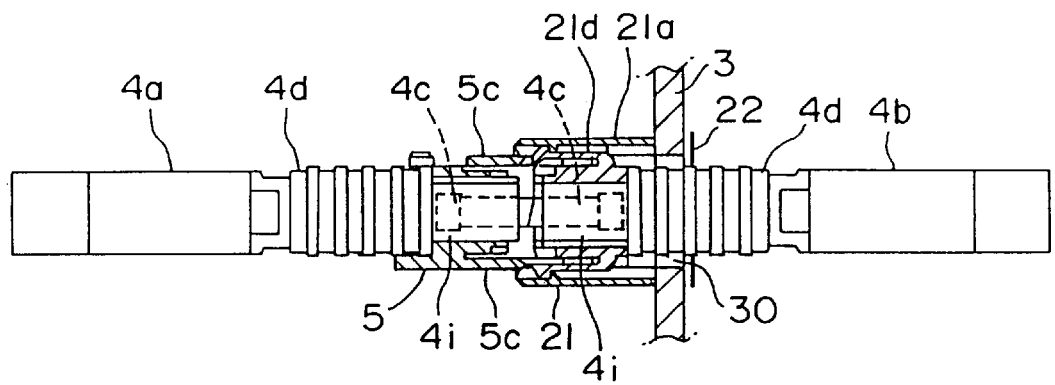
FIG. 7A is a planar cross-sectional drawing showing the MPO plugs during engagement.
Figure 7B:
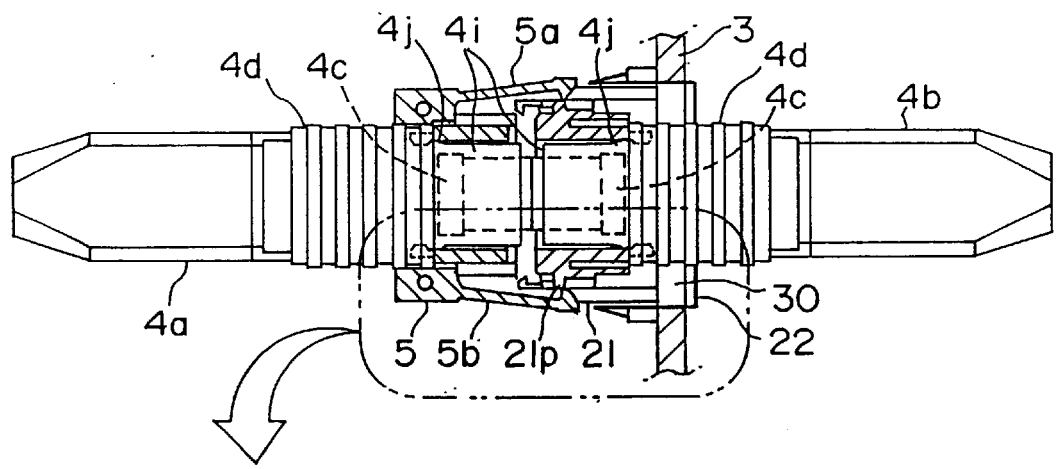
FIG. 7B is a side view thereof.
Figure 7C:
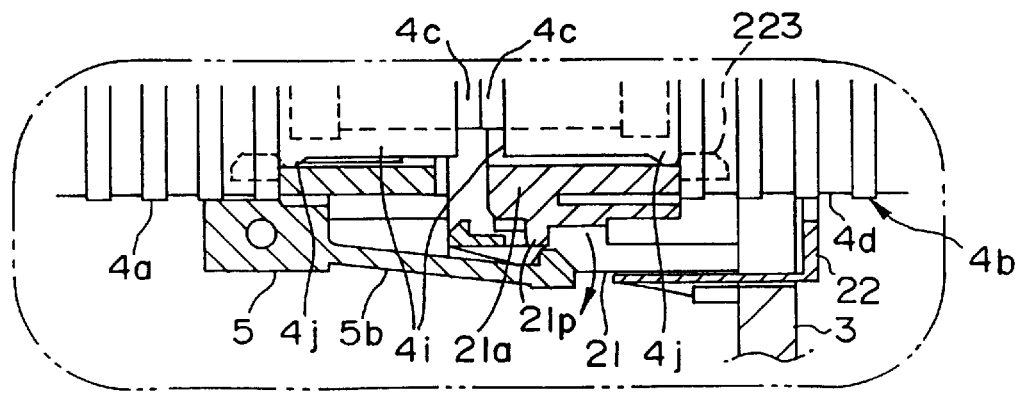
FIG. 7C is an enlarged side cross-sectional drawing showing the deformed state of a claw of the PH housing.

As shown in FIG. 7A, FIG. 7B, and FIG. 7C, when the PH housing 5 is engaged in the BH housing 20 assembled with the MPO plug 4b inserted in advance, first, the insertion and engagement of the guide pins 4p into the guide pin holes 4q is carried out via the optical connector ferrules 4c at the ends of the MPO plugs 4a and 4b, and the contacting end surfaces of the optical connector ferrules 4c are correctly positioned with each other, and abutted. At this time, the claws 4a and 5b on both sides of the PH housing 5 ride over the external projections 21p projecting from the outside of the housing body 21, and are pushed apart so as to separate from each other.

Figure 8A:
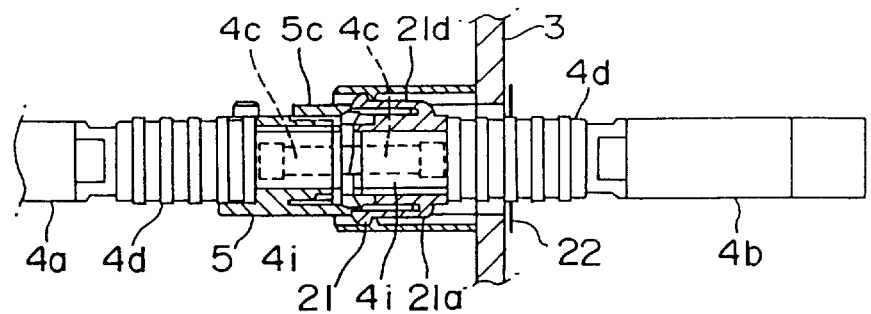
FIG. 8A is a planar cross-sectional drawing showing the external engaged state of the PH housing with respect to the BH housing.
Figure 8B:
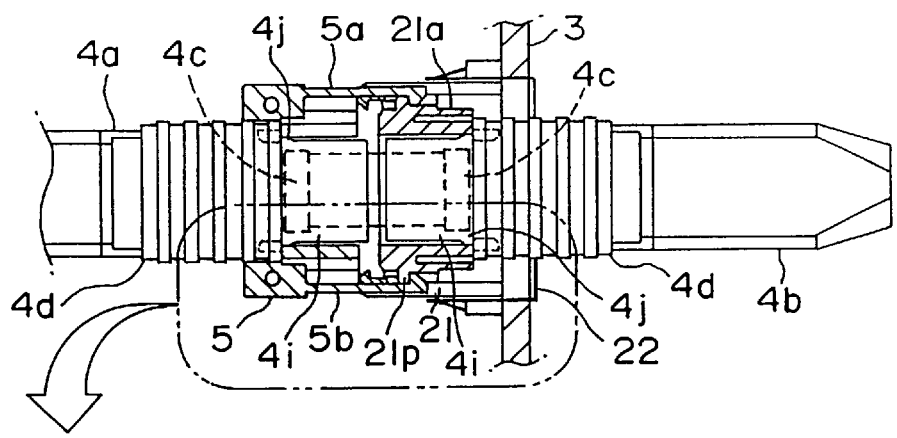
FIG. 8B is a side cross-sectional drawing thereof.
Figure 8C:
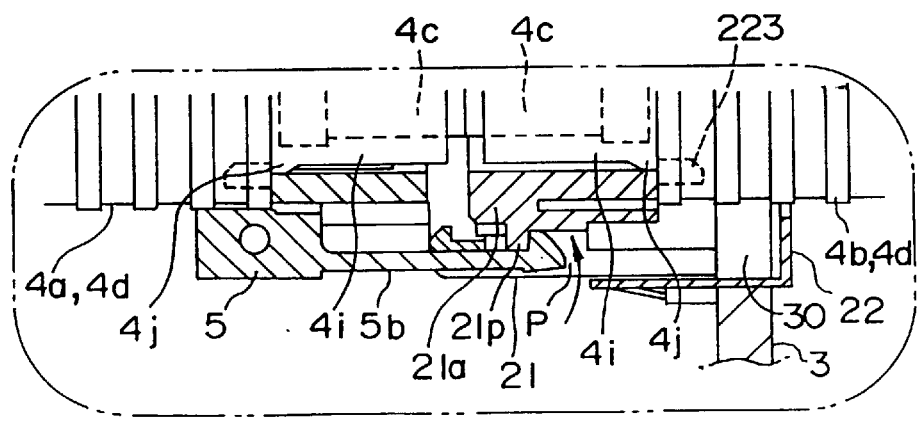
FIG. 8C is an enlarged side cross-sectional figure showing the engaged state of one of the claws of the PH housing and an external projection of the housing body.

Next, as shown in FIG. 8A, FIG. 8B, and FIG. 8C, as further insertion of the PH housing 5 into the BH housing 20 continues, the claws 5a and 1b of the PH housing 5 respectively engage the external projections 21p of the housing body 21. At this time, the extraction of the PH housing 5 in the rearward direction (the left side in the figure) is restricted, and at the same time, in FIG. 8C, the PH housing 5 is allowed to shift within the concavity p.

Figure 9A:
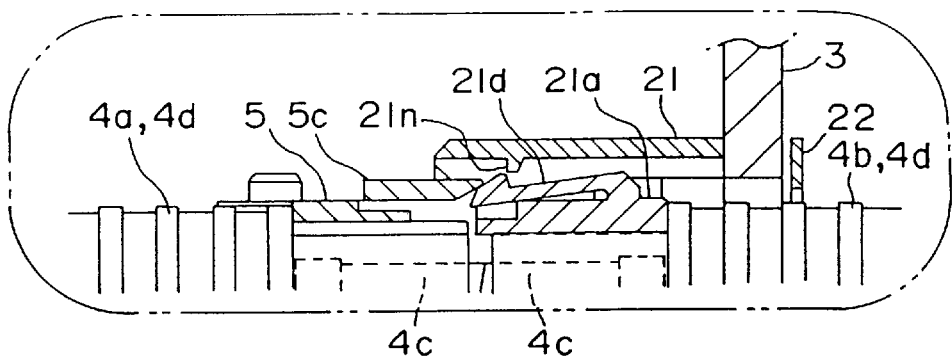
FIG. 9A is an enlarged planar cross-sectional drawing showing the release of an engagement between an engaging claw of the internal housing and an engaging projection of the housing body.
Figure 9B:
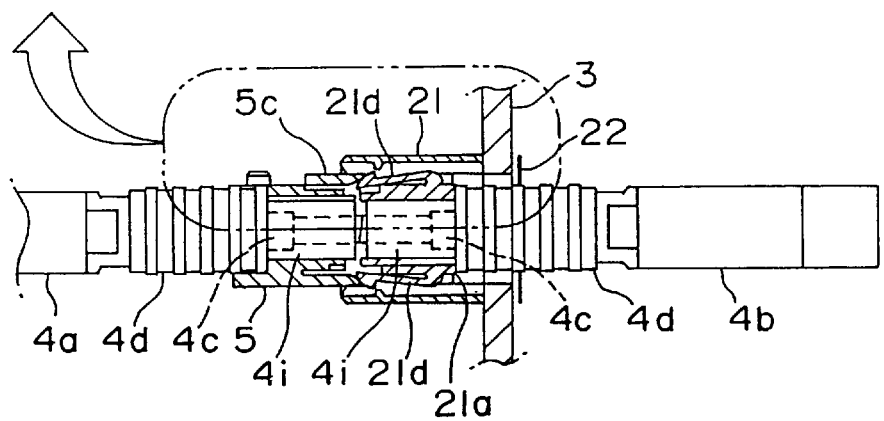
FIG. 9B is a planar cross-sectional drawing.
Figure 9C:
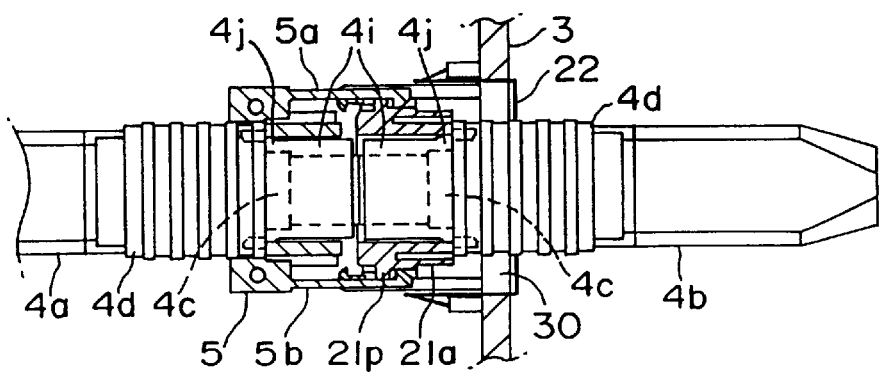
FIG. 9C is a side cross-sectional drawing showing the release of the engagement between the engaging claws of the internal housing and the engaging projections of the housing body by the pressing projections of the housing body.

Next, as shown in FIG. 9A, FIG. 9B, and FIG. 9C, as further insertion of the PH housing 5 into the BH housing 20 continues, the pressing projection 5c that projects from the PH housing 5 is inserted along the wall inside the housing body 21, and thereby the engaging claws 21d of the internal housing are separated from the adjacent wall in the housing body 21, and the engagements between the engaging claws 21d and the engaging projections 21n is released. Until this time, due to the engagement of the engaging claws 21d and the engaging projections 21n, the condition of the accommodation of the internal housing 21a in the housing body 21 is stable, but when the engagement is released due to the pressing projection 5c, the movement of the internal housing 21a within the housing body 21 becomes free, and the misalignment between the MPO plugs 4a and 4b can be offset with high efficiency. At this time, the shifting within the range of the concavity p also contributes to offsetting the misalignment between the MPO plugs 4a and 4b. At the MPO plugs 4a and 4b, due to the spring built into the housing 4i, the optical connector ferrule 4c is urged in the forward direction of the abutment connection, and thus, when the optical connector ferrules 4c and 4c of both MPO plugs 4a and 4b abut each other, the tensile force of this spring acts as a force to bring about abutment between the optical connector ferrules 4c and 4c, and the state of the connection between optical connector ferrules 4c and 4c is stabilized, and a low connection loss is reliably obtained.

Figure 10A:
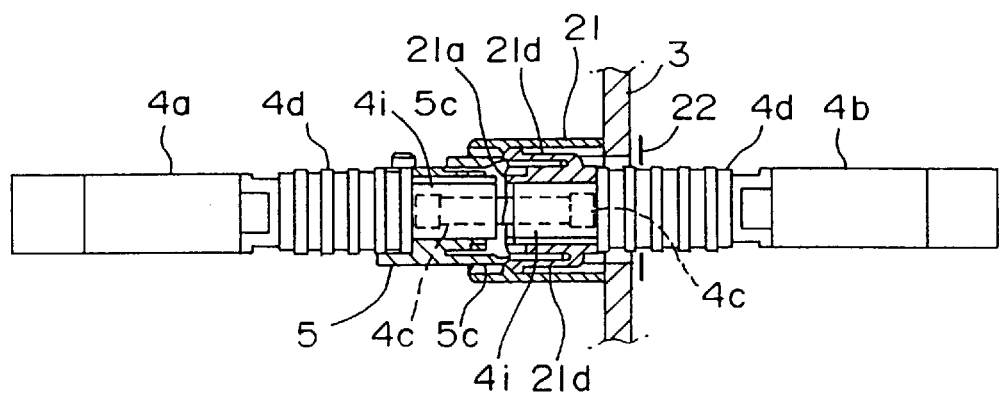
FIG. 10A is a planar cross-sectional drawing showing the final state of the engagement of the PH housing with respect to the BH housing.
Figure 10B:
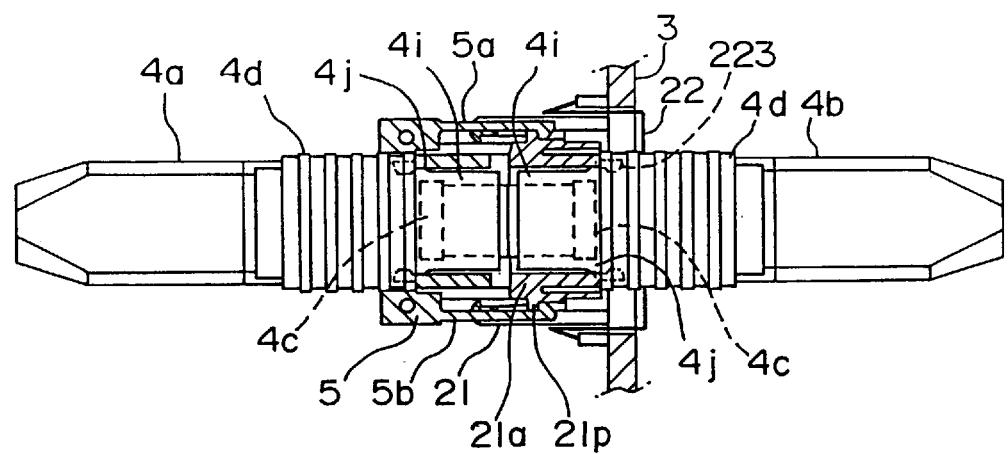
FIG. 10B is a side cross-sectional drawing thereof.

In addition, finally the state shown in FIG. 10A, FIG. 10B, and FIG. 10C is attained.

The above-described connection process and the relationship between the internal housing 21 and the PH housings, etc., are the same for each of the concrete examples described below, and even in the concrete examples wherein the structure of the PH housing has been altered, the relationship is fundamentally the same.

Moreover, the above-described shape of the housing body 21, the internal housing 21a, the fixed part 22, and the PH housing 5, etc., are not limiting, and as appropriate, or course the design can be changed.

For example, the fixed part more preferably uses a structure providing a spring between both flexible claws 25 and 25.

Figure 11:
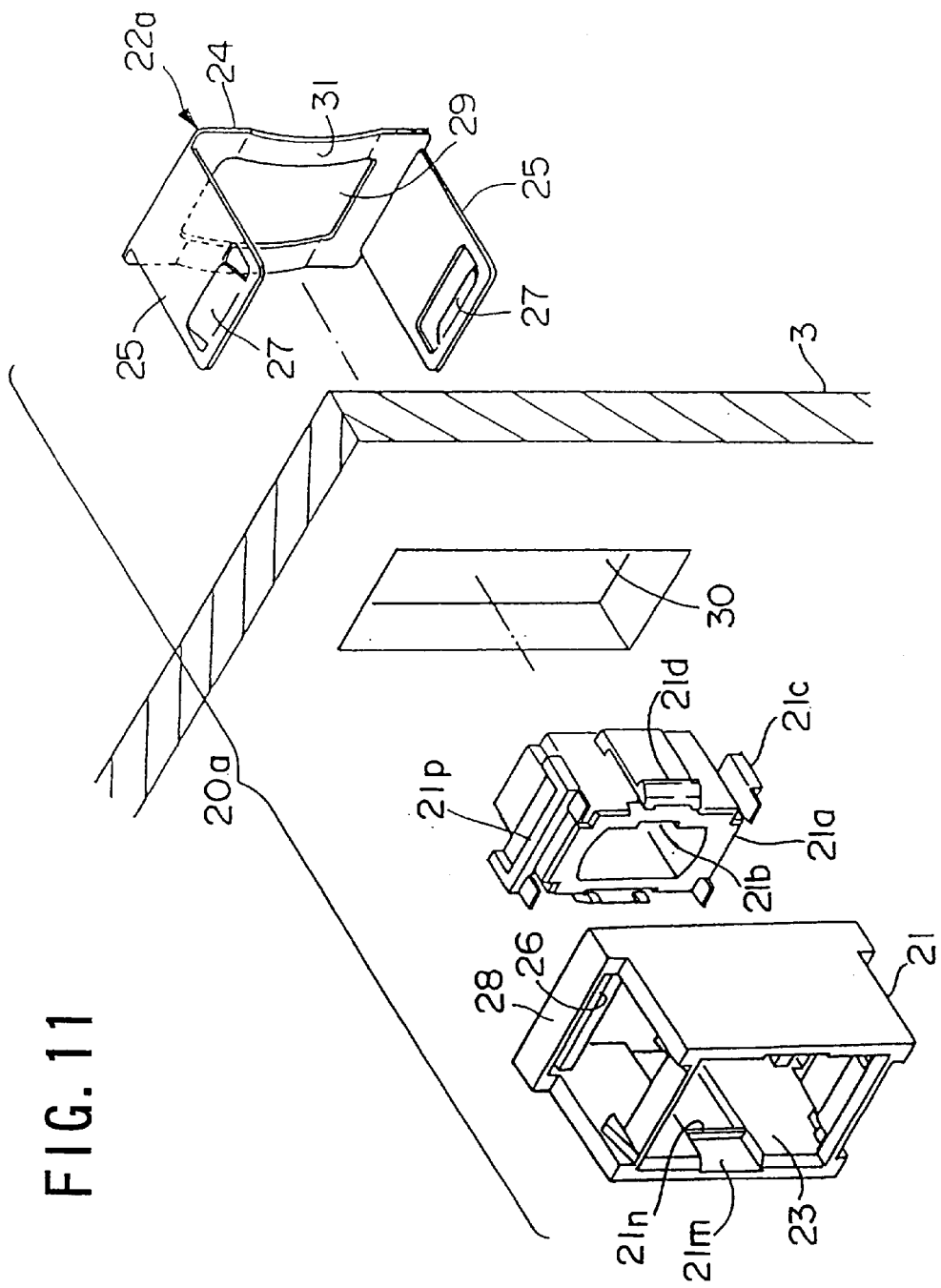
FIG. 11 is a perspective drawing showing the fixed part having a curved spring part such that the peak is positioned at the center of both flexible claws.
Figure 12:
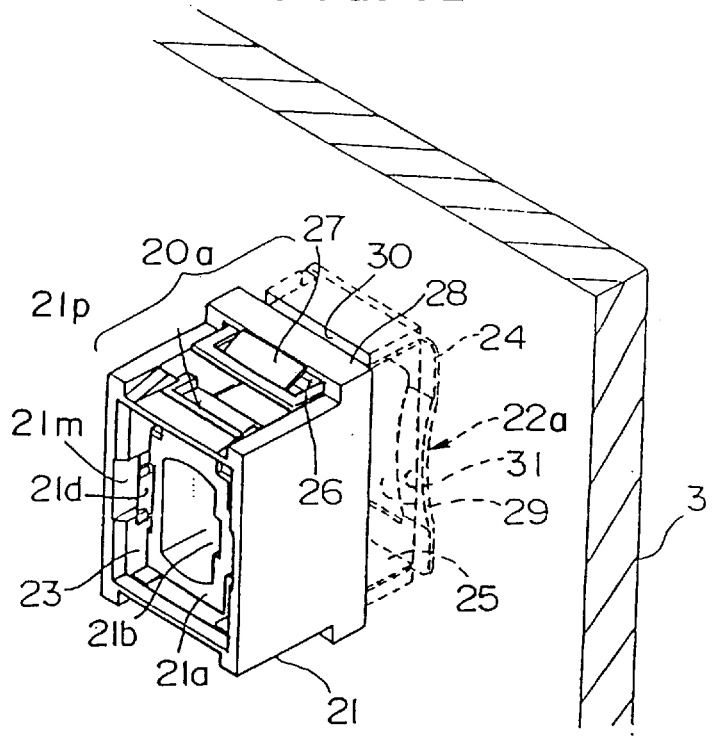
FIG. 12 is a perspective drawing showing the assembled state of the BH housing using the fixed part in FIG. 11.
Figure 13:
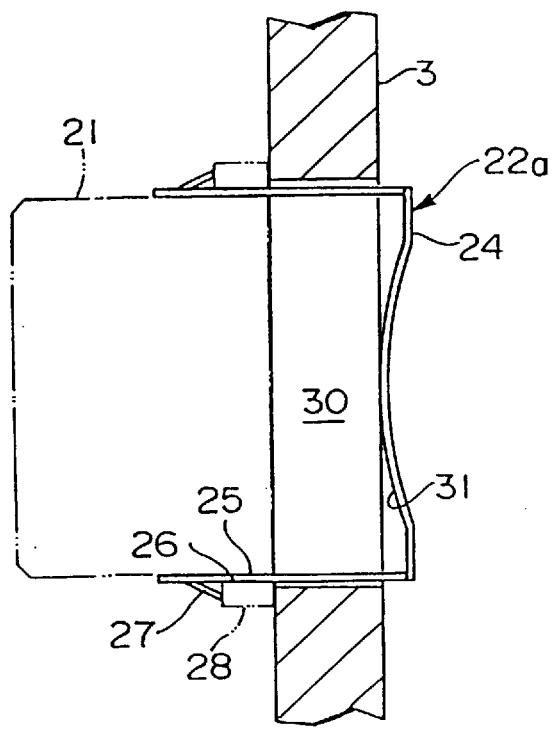
FIG. 13 is a side view showing the fixed part in FIG. 12.

The fixed part 22a shown in FIG. 11, FIG. 12, and FIG. 13 joins between both the flexible claws 25, and a spring part 31 is formed on the body 24 extending to both sides opposite the plug insertion hole 29. The reference numeral 20a is the BH housing, which is formed by the housing body 21, the internal housing 21a, and the fixed part 22a.

In FIG. 11, the spring part 31 is a curved part that is formed by imparting a curve to the body 24 between both flexible claws 25, 25. As shown in FIG. 12 and FIG. 13, when the flexible claws 25 and 25 are inserted into the installation hole 30 and then engaged in the housing body 21, the spring part 31 abuts the backplane 3, and the backplane 3 is held between the housing body 21 and the spring part 31. In addition, within the range of flexible deformation of the spring part 31, the operability of the engagement with the PH housing 5 can be improved because the error in the thickness dimension of the backplane is offset, the installation state of the housing body 21 is stable, and furthermore, the desired floating range due to the clearance shown in FIG. 4 is obtained in the housing body 21.

In the case that the thickness dimension of the backplane 3 is larger than a specified dimension, when the flexible claws 25 and 25 of the fixed part 22a are pressed into the engaging hole 26 of the housing body 21 from the installation hole 30, the spring part 31 abutting the backplane 3 is flexibly deformed by the pressing force, and thereby the flexible claws 25 and 25 can be engaged in the engaging parts 26 and 26 of the housing body 21. Contrariwise, even in the case that the thickness dimension of the backplane 3 is smaller than a specified dimension, because the error in the dimension of the backplane 3 is offset by the flexible deformation of the spring part 31, the occurance of an excessive gap between the fixed part 22a and the housing body 21 can be prevented, and in the housing body 21, the desired floating range can be reliably attained due to the range of movement of the flexible claws 25 and 25 within the installation hole 30. By thus preventing floating of the housing body 21 beyond what is necessary, the operation of engaging the PH housing 5 can be carried out with high efficiency.

Figure 14:
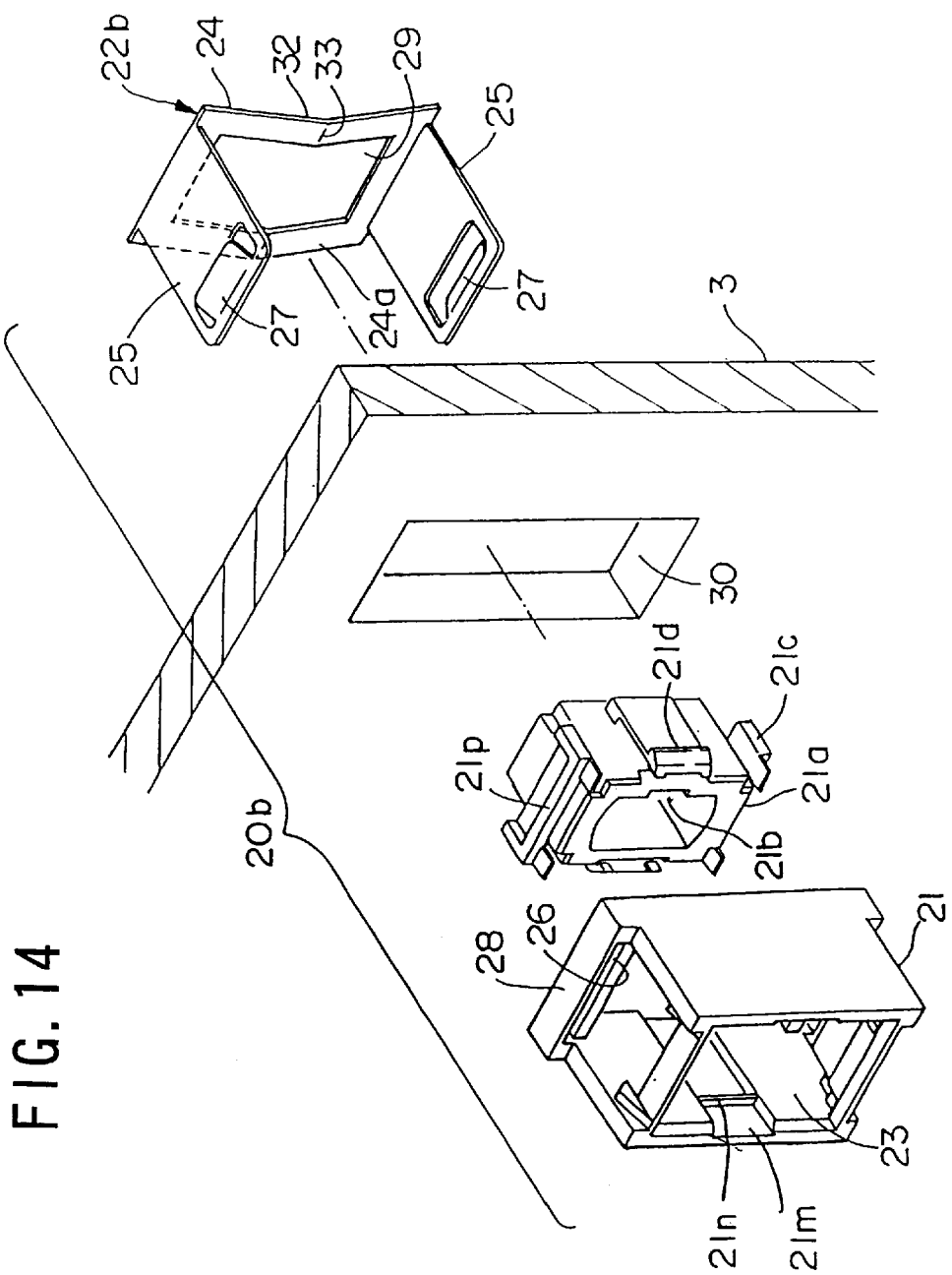
FIG. 14 is a perspective drawing showing the fixed part having an angle shaped spring part is angled such that the peak is positioned at the center of both flexible claws.

In the fixed part 22b shown in FIG. 14, a spring part 32 is formed in which the body 24 that extends on both sides of the plug insertion hole 29 so as to join both flexible claws 25 and 25 is bent at an angle. This spring part 32 has a peak 33 in the center in the longitudinal direction (top to bottom in FIG. 14) of the long frame shape of the body 24, that is, at the center between the flexible claws 25 and 25. When the BH housing 20b is assembled so that the backplane 3 is held by the housing body 21 and the fixed part 22b, the contact part of the spring part 32 with the backplane 3 is only the peak 33, and thus the sliding resistance between the backplane 3 and the spring part 32 can be significantly reduced, and the housing body 21 can slide more freely.

Figure 15:
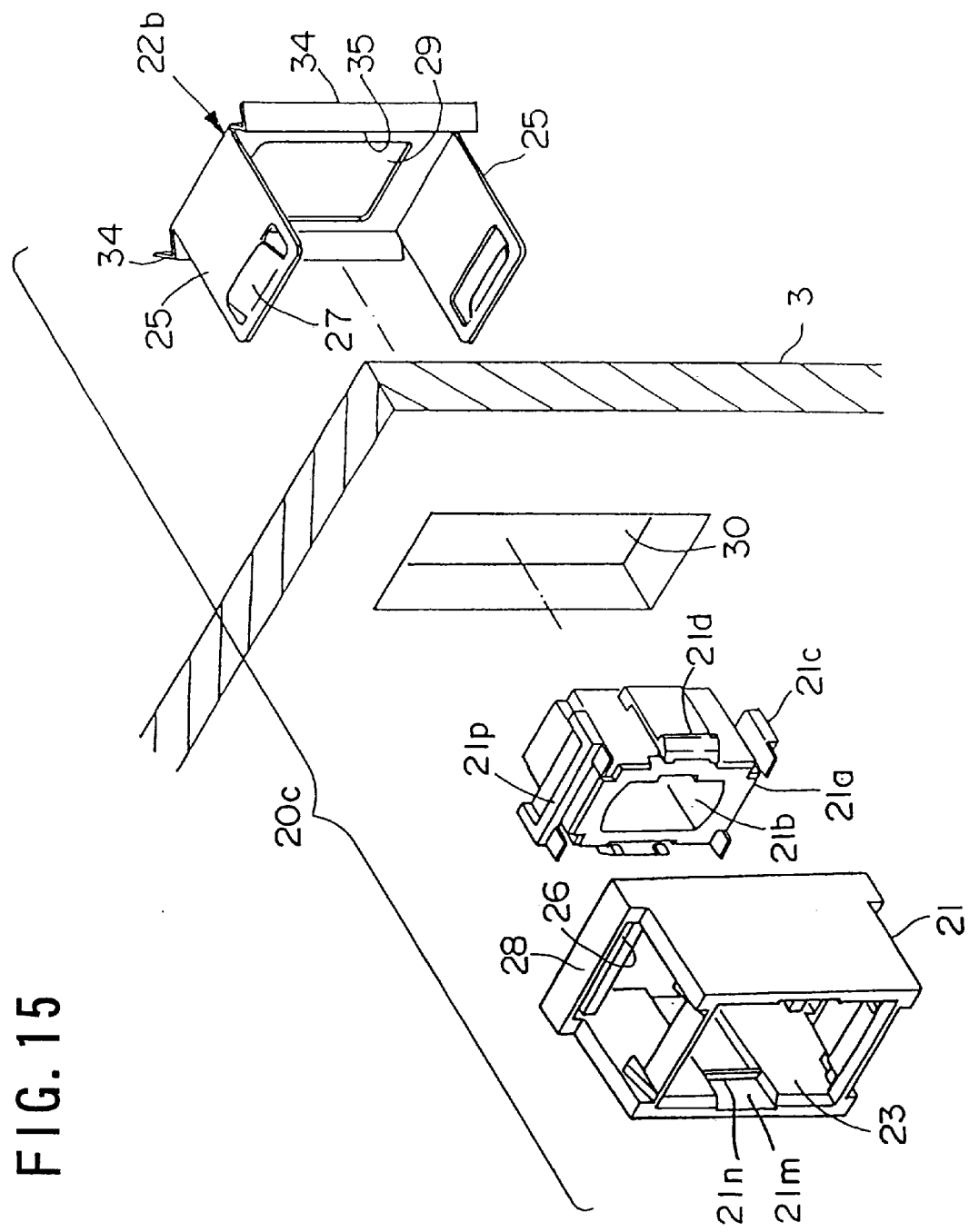
FIG. 15 is a perspective drawing showing the fixed part having an angle shaped spring part extending uniformly between both flexible claws.

The spring part 34 of the fixed part 22c shown in FIG. 15 is a bent part, wherein the body 24, extending on both sides of the plug insertion hole 29 so as to join both flexible claws 25 and 25, is bent at an angle that extends over between the flexible claws 25 and 25. Therefore, when the BH housing 20c is assembled by enclosing the backplane 3 by the housing body 21 and the fixed part 22c, the entire peak 35 extending along the whole length of the spring part 34 abuts the backplane 3, the contact area with the backplane 3 is sufficiently guaranteed, and the elasticity can act stably. Because the elasticity can be sufficiently guaranteed with this spring part 34, when the PH housing 5 is engaged with the housing body 21, it is preferably used when a large force is acting.

Moreover, the spring part is not limited to one which forms the body of the flexible part, and a flat spring or a coil spring mounted in the fixed part can also be used.

Next, an example of the structure of the internal housing will be explained.

Figure 16:
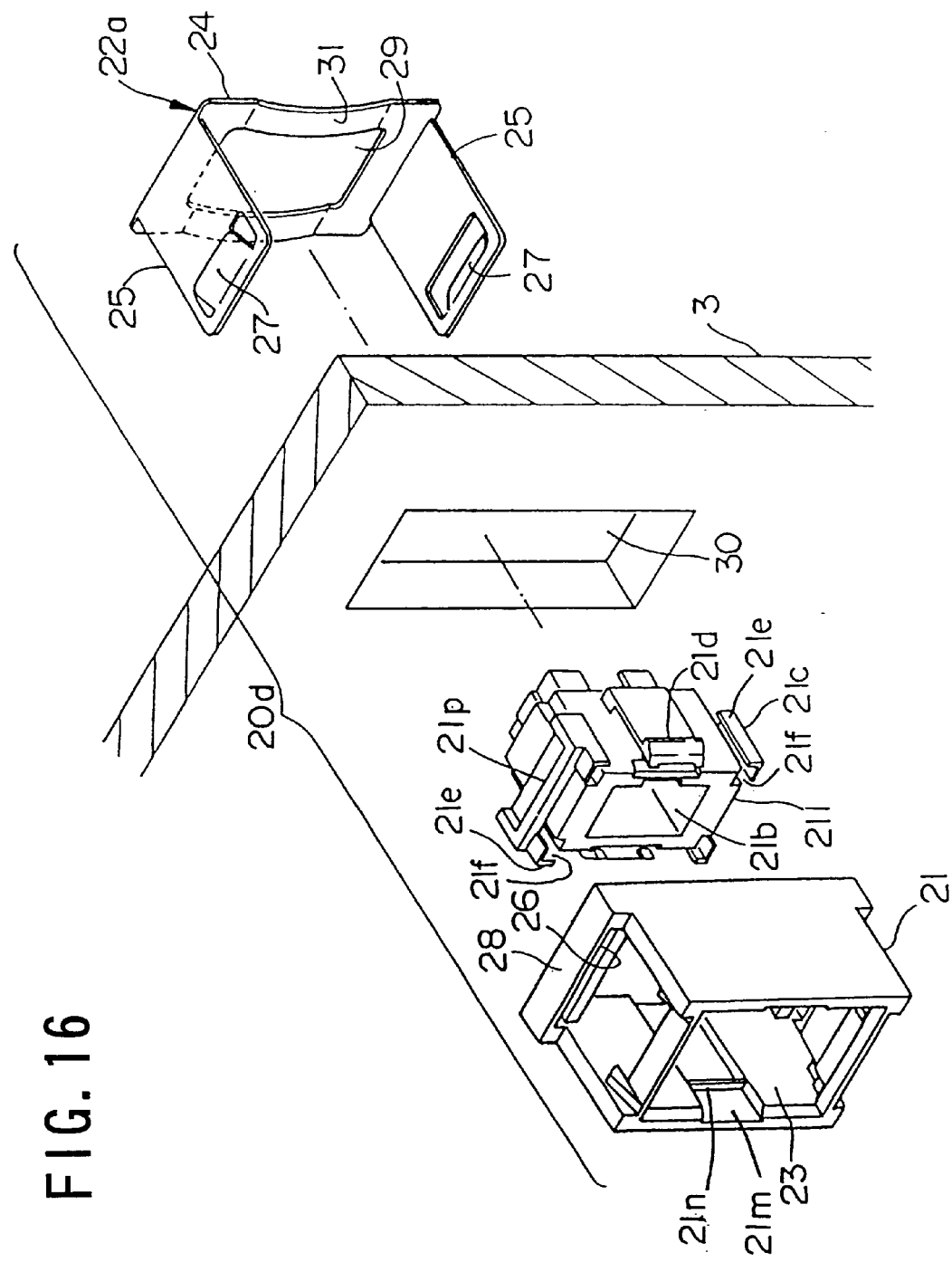
FIG. 16 is an exploded perspective drawing showing a BH housing using the internal housing provided with a projecting wall for reinforcement.
Figure 17:
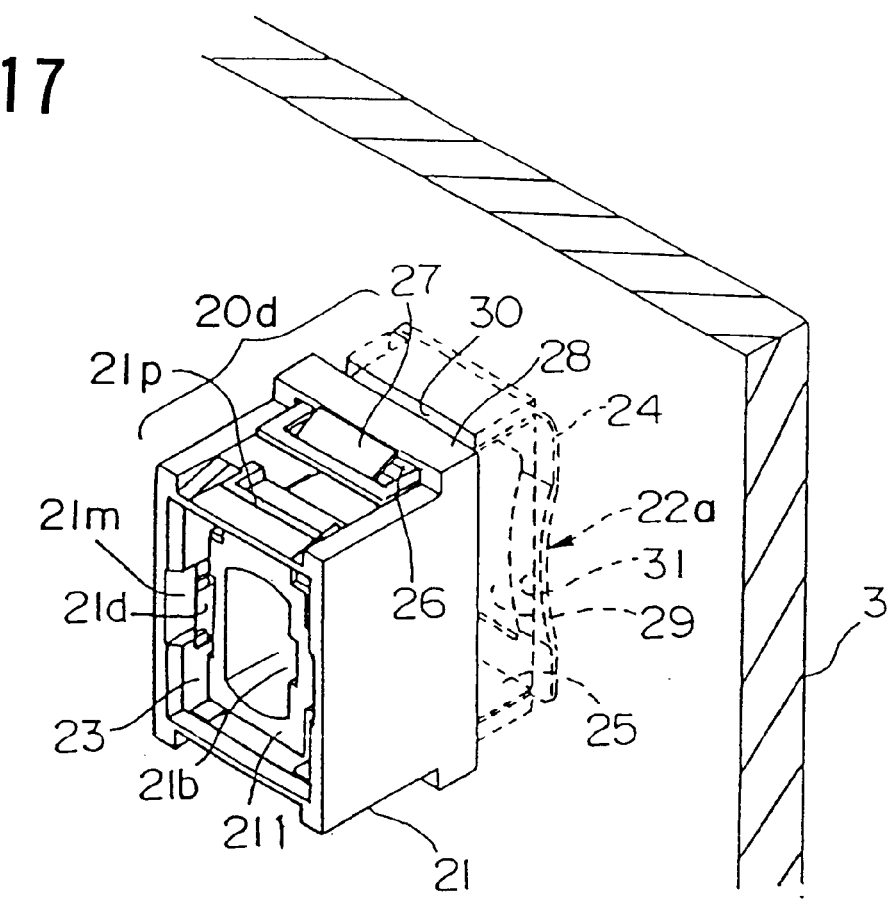
FIG. 17 is a perspective drawing showing the assembled state of the BH housing in FIG. 16.

The sleeve shaped internal housing 211 having a positioning projection 21c and a projection wall 21e projecting on its four corners is inserted in the housing body 12 that forms the BH housing 20d shown in FIG. 16 and FIG. 17. In the BH housing 20d the backplane 3 is held between the housing body 21 and the fixed part 22a, and the difference between this and the BH housing 20a shown for example in FIG. 11 is the use of the internal housing 211.

Figure 18:
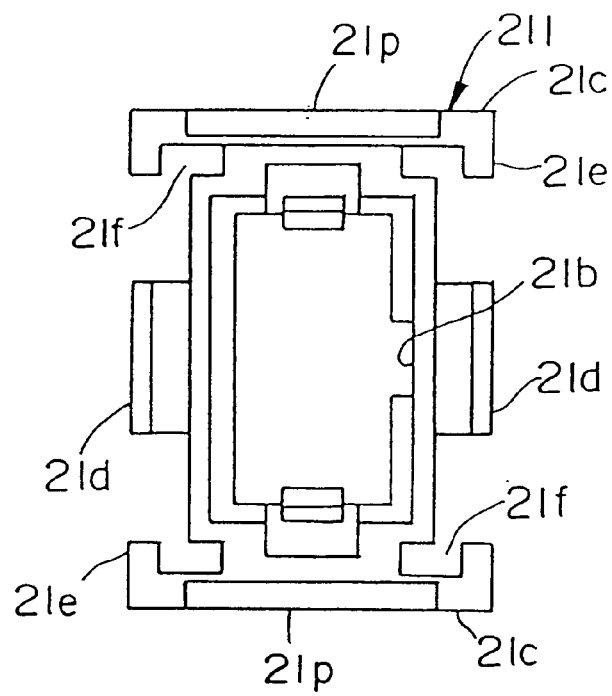
FIG. 18 is a drawing viewing the internal housing of FIG. 16 from the backplane side.

FIG. 18 is a drawing of the internal housing 211 viewed from the backplane 3 side.

Figure 19:
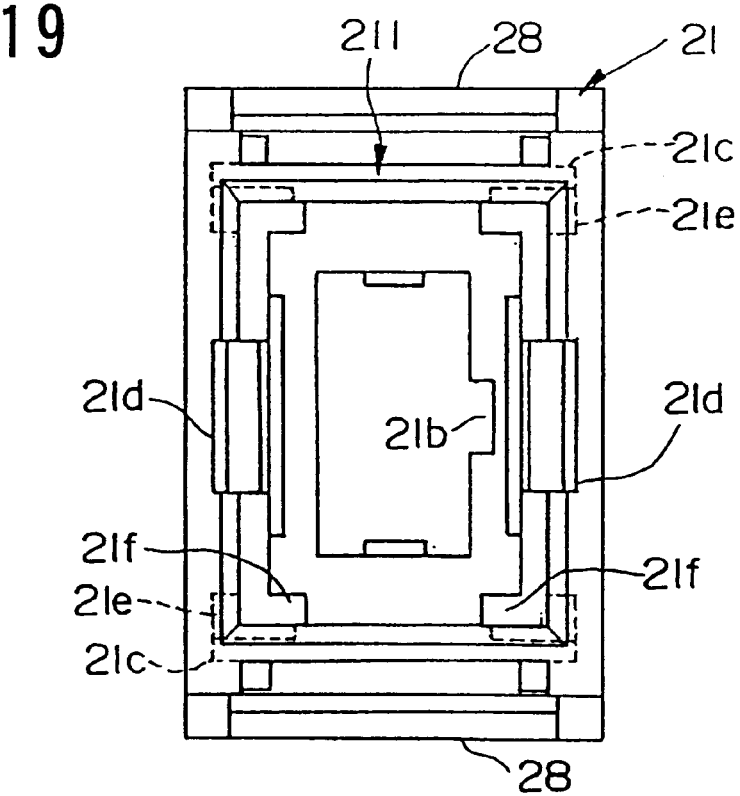
FIG. 19 is a drawing viewing from the opposite side the state of the internal housing of FIG. 16 engaged in the housing body from the side opposite the backplane.

As shown in FIG. 18, this positioning projections 21c are provided on both ends of the external projections 21p in the direction extending parallel to each other on both the upper and lower ends (top to bottom in FIG. 18) of the internal housing 211. Adjacent to each positioning projection 21c, a projecting wall 21e projects. The projecting wall 21e is a small wall that projects towards the positioning projection 21c on the opposing side vertically from the positioning projection 21c, and as shown in FIG. 19, when the internal housing 221 is inserted into the housing body 21, its outer surface abuts the wall surface in the housing body 21.

In addition, in the internal housing 211, by being held between the positioning projection 21c and the projecting wall 21e, a double-wall accommodation groove is formed. When the PH housing 36 (refer to FIG. 20) is engaged into the BH housing 20d, the double wall 36a projecting on the PH housing 36 is inserted.

Figure 20:
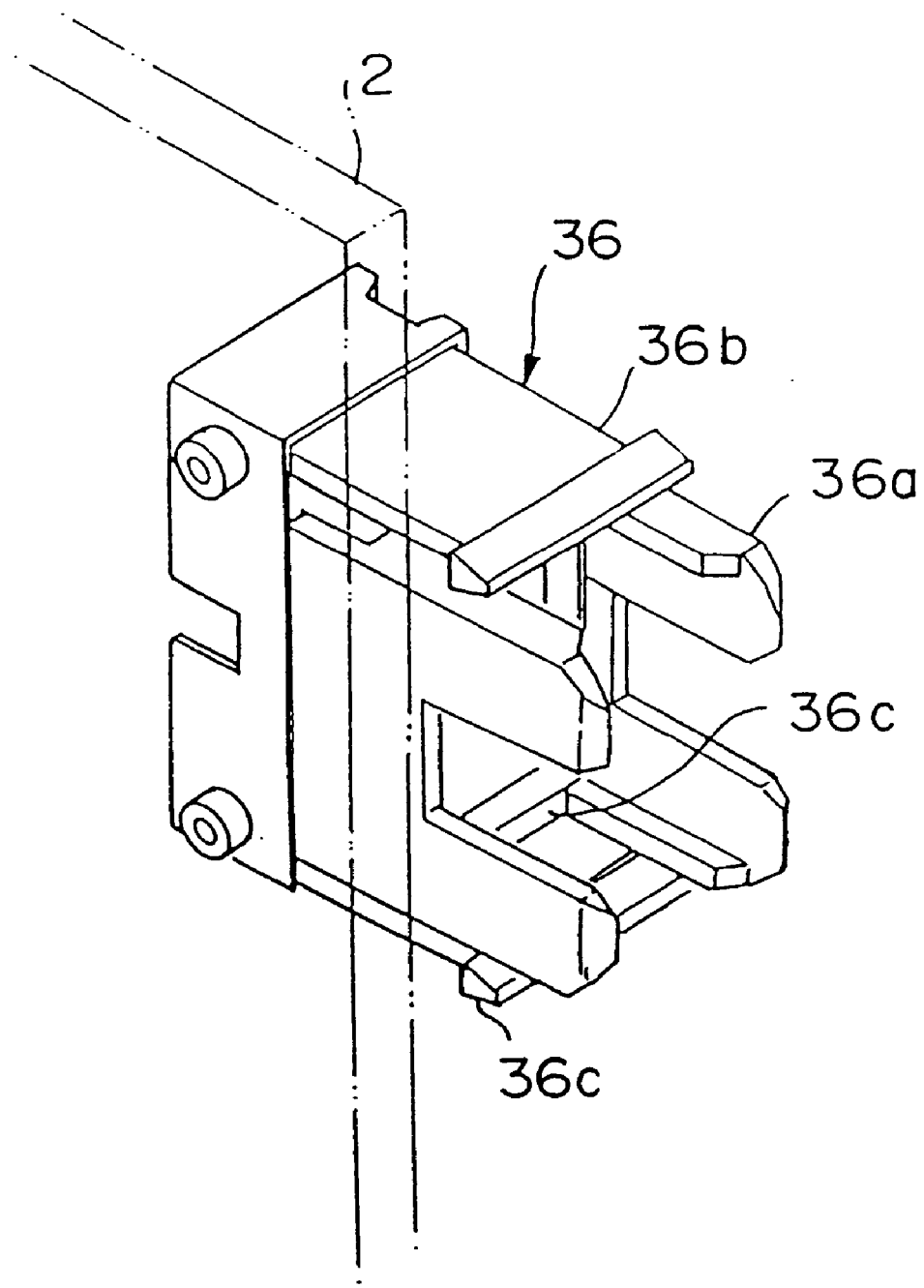
FIG. 20 is a perspective drawing showing the PH housing.

FIG. 20 is a perspective drawing showing the PH housing 36 of the optical connector in the embodiment of the present invention.

In FIG. 20, on both sides of the PH housing 36, a pair of release claws 36b and 36b that can be disengaged from the housing body 21 are disposed opposite each other. In addition, a supporting wall 36c is provided on the inside of the PH housing 36. The supporting wall 36c has a sleeve shape, and the MPO plug 4a supported in the PH housing 36 is positioned and accommodated in this supporting wall 36c. In addition, the double wall 36a projects on the end of the PH housing 36 in the direction of insertion into the BH housing 29d (right to left in FIG. 20). When the PH housing 36 is inserted into the internal housing 211, the double wall 36a can be inserted into the double walled accommodating grove 21f. When the supporting wall 36c abuts the engaging claw 21d, the MPO plug 4a accommodated and supported in the PH housing 36 is inserted at a specified position of the housing body 21, and connects by abutment with the MPO plug 4b inserted from the side opposite to the housing body 21 (the installation hole 30 side).

Because the shape of the double wall 36a conforms almost completely with that of the double walled accommodation groove 21f, the double wall 36a that is inserted into the double walled accommodation groove 21f (refer to FIG. 19) is placed over the projecting wall 21e without causing a gap, and thus an integral wall is formed. Therefore, because the internal housing 211 is supported at a specified position by the housing body 21 and this double wall 36a, even when lateral tensile force (what is termed "side-pull") on the MPO plugs 4a and 4b acts, the deformation resistance force of the housing part 21 towards this is greatly increased, and thus the internal housing 211 is stably supported at a specified position. Further, inconveniences such as deformation and fracturing of the housing body 21 and the internal housing 211 can be prevented.

In addition, as shown in FIG. 21, when the PH housing 36 is engaged with the housing body 21 (at this time, the double wall 36a is inserted into the double walled accommodating groove 21f, not shown in FIG. 21), and the supporting wall 36c abuts the projecting wall 21e (not shown in FIG. 21), the deformation resistance force of the housing body 21 is improved by the supporting wall 36c engaging in the housing body 21, and thus the deformation resistance force of the housing body 21 to the tensile force in the lateral direction can by significantly improved, and the precision of the positioning of the MPO plugs 4a and 4b over a long period of time can be maintained.

When the deformation resistance force of the housing body 21 is improved by the supporting wall 36c engaging in the housing body 21, even if the tensile force acts on the MPO plugs 4a and 4b in the lateral direction, the precision of the positioning can be maintained over a long period of time. Concretely, because the connection between the MPO plug 4a and 4b is carried out by an abutment connection between the optical connector ferrules 4c with the ends of the MPO plugs 4a and 4b, misalignment between the optical connector ferrules 4c in a state of abutment connection can be reliably prevented by preventing deformation of the housing body 21. Thereby, no shifting of the connection state between the MPO plugs 4a and 4b occurs, and a desired low connection loss can be reliably maintained.

Figure 22:
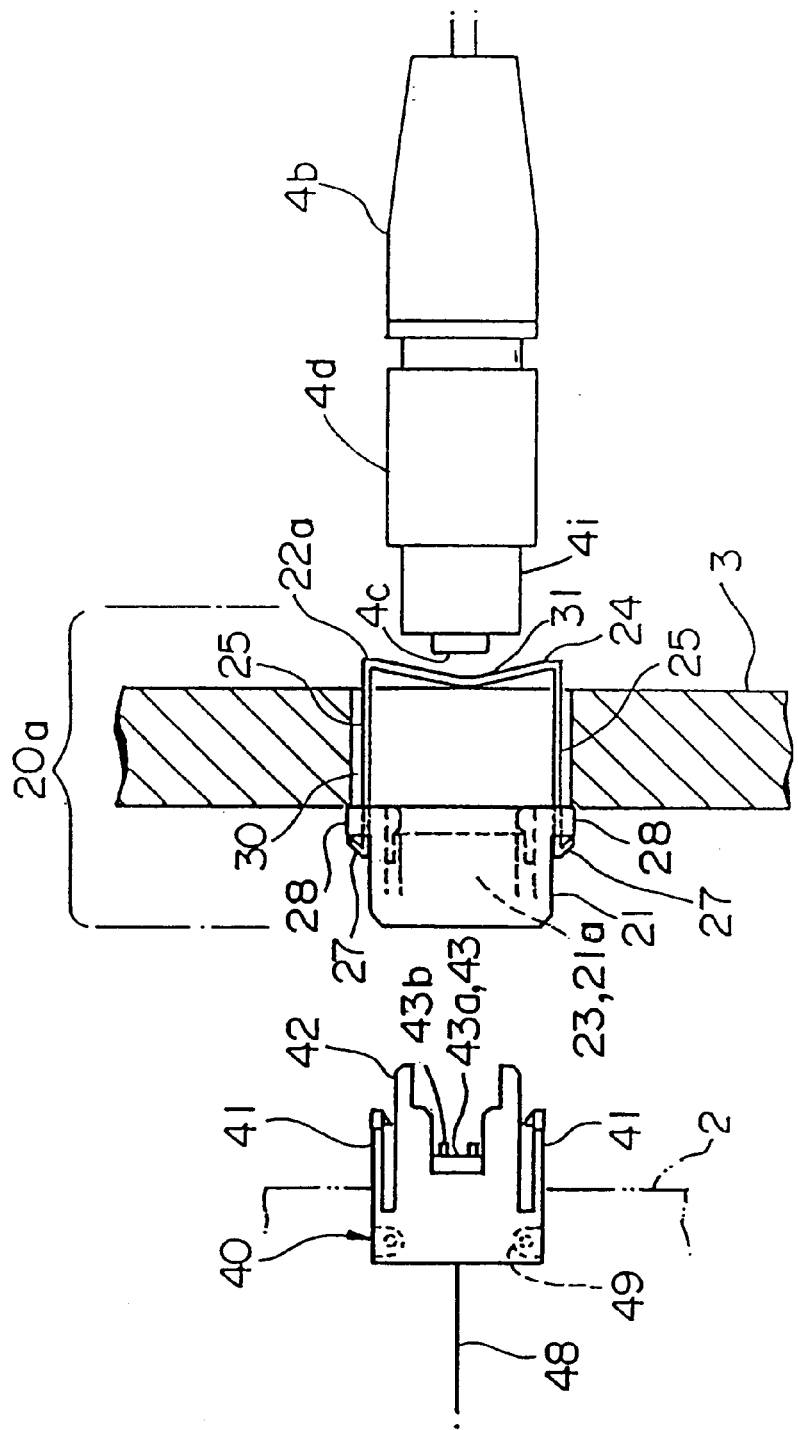
FIG. 22 is a side view showing the optical connector (BP connector) using the simplified PH housing directly accommodating an optical connector ferrule.
Figure 23:
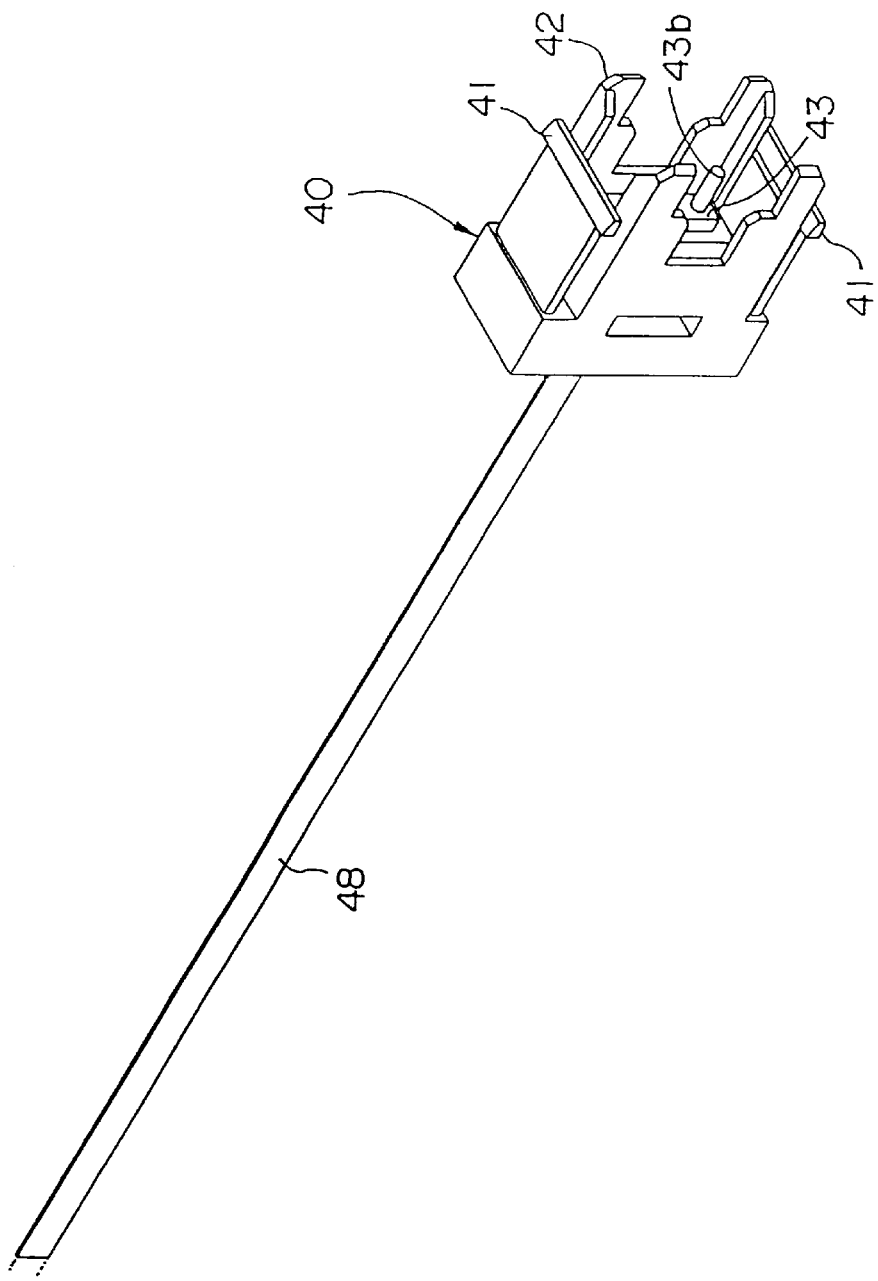
FIG. 23 is a perspective drawing showing the PH housing in FIG. 22.
Figure 24:
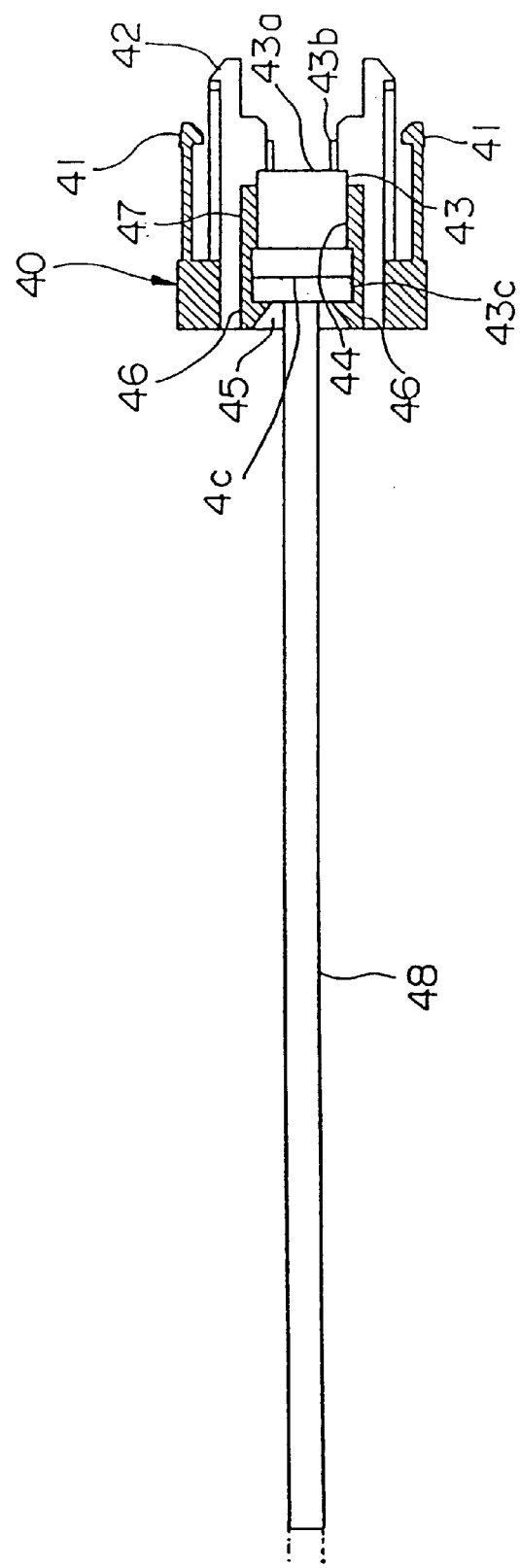
FIG. 24 is a side cross-sectional drawing showing the PH housing in FIG. 22.

With this optical connector, any type of structure for a PH housing can be used: the type of PH housing 40 that directly accommodates the optical connector ferrule 43 as shown in FIG. 22 to FIG. 24, the PH housings 401, 58, etc, that have superior installation properties for a printed board 2, as shown in FIGS. 25 to 30, etc.

The entire PH housing 40 shown in FIG. 22 is made of a resin such as plastic, and can be detachably engaged with the housing body 21 of the PH housing 20a assembled on the backplane 3. In FIG. 22, the example applying the PH housing 20a illustrated in FIG. 11 to FIG. 13 is shown, but this is not limiting, and any type of structure for the adopted BH housing 20, such as that disclosed in FIG. 1, can be used.

Moreover, reference numeral 49 in FIG. 22 is an installation part for installing the PH housing 40 on the printed board 2.

FIG. 23 is a perspective drawing showing the PH housing 40, and FIG. 24 is a cross-sectional drawing showing its interior.

As shown in FIG. 23, on both sides of the PH housing 40, release claws 41 and 41 that can be detachably engaged with the housing body 21 are provided. In addition, on the front part of the PH housing 40 in the direction of the engagement and insertion into the housing body 21, a guide projection 42 that is inserted into this housing body 21 projects.

As shown in FIG. 24, in the interior of the PH housing 40, a plug accommodation groove 44 that accommodates an optical connector plug 43 (optical connector ferrule) stipulated by JIS C 5981 is provided. This plug accommodation groove 44 has an accommodation groove opening 45 on the side opposite to the direction of the engagement and insertion of the PH housing 40 into the housing body 21, and flexibly deformable support claws 46 project to engage and support the optical connector plug 43 accommodated in this plug accommodation groove 44 adjacent to the accommodation groove opening 45. On the optical connector plug 43, the guide pins 43b that position the optical connector plugs 4b with the optical connector ferrules 4c on the same side of the connection are engaged and maintained in a state projecting from the abutment end side 43. Furthermore, with this abutment end surface 43a, the pin clamp 43c that holds the guide pins 43b is installed at the opposite back end.

With this PH housing 40, while flexibly deforming the supporting claws 46, this optical connector plug 43 with the pin clamp 43c attached can be pressed from the accommodation groove opening 45 to the plug accommodation groove 44. In addition, because the optical connector plug 43 that is pressed into the plug accommodation groove 44 is held between the supporting wall 47 and the supporting claw 46 formed in the PH housing 40, the desired positioning in the plug accommodation groove 44 can be stably supported.

When the optical connector plug 43 that can terminate with the optical fiber 48 (optical fiber core) in an abutment connection manner is inserted into the plug accommodation groove 44, the optical fiber 48 can be extracted from this accommodation groove opening 45.

Moreover, the optical fiber that terminates in the optical connector plug 43 can be either single or multi-core.

The optical connector plug 43 that is accommodated in the plug accommodation groove 44 abuts the support wall 47, and thereby the projection in the forward direction towards the engagement and insertion of PH housing is set. Therefore, in the housing body 21 (refer to FIG. 22), when the optical connector plug 43 connected to the optical connector ferrule 4c on the MPO plug 4b side is extracted, the inconvenience of this optical connector plug 43 falling out of the plug accommodation groove 44 can be prevented, and the extraction operation can be carried out with high efficiency. In addition, as shown in FIG. 24, the support claw 46 sets the movement limit of the optical connector plug 43 away from the direction of engagement and insertion, and at the same time, when abutment connected with the optical connector ferrule 4c, the abutment force of the MPO plug 4b side is borne thereby.

Moreover, the connection end surface 43a of the optical connector plug 43 accommodated in the plug accommodation groove 44 is always exposed outside the support wall 47, and thus at the same time that the PH housing 40 is engaged in the housing body 21, the optical connector plug 43 supported in this PH housing 40 and the optical connector ferrule 4c of the MPO plug 4b supported on the housing body 21 side are abutment connected.

With this optical connector, simply by pressing the optical connector plug 43 into the plug accommodation grove 44 from the accommodation groove opening 45, the optical connector plug 43 can be simply accommodated at a specified position within the PH housing 40, and thus the assembly operability is significantly improved. Contrariwise, simply by flexibly deforming the support claws 46 so as to part towards the outside, the operation of extracting the optical connector plug 43 from the plug accommodation groove 44 can be easily carried out.

In addition, because of the small size of the optical connector plug 43, which is an optical connector ferrule defined by JIS C 5981, the PH housing 40 that directly accommodates it can be significantly miniaturized in comparison to the PH housing 5 (refer to FIG. 46) that accommodates the MPO plug 4a, and the printed board 2 in the plug-in unit 1 and the pitch of the arrangement of the PH housing 40 can be significantly reduced, and thus the number of cores to which the optical connector can be applied can be increased.

Moreover, the PH housing of the optical connector of the present invention is not limited to the PH housing 40 shown in the above examples, and can be adapted to any type of structure that supports any type of optical connector ferrule not defined in JIS C 5981 and optical connector plugs such as the simplified MPO plug.

The PH housing 401 shown in FIG. 25 to FIG. 28 is installed on a printed board 2 by a rivet part 55 described in detail below, and by inserting the printed board 2 into the plug-in unit 1 (refer to FIG. 46 of the related art), it is engaged into the BH housing 20a. In addition, at the same time as this engagement, the end of the MPO plug 4a engaged in advance in this PH housing 401 is inserted into the internal housing 21a, which is inserted into the plug accommodation hole 23 of the housing body 21, to form an abutment connection with the MPO plug 4b inserted into the internal housing 21a from the installation hole 30.

Figure 26:
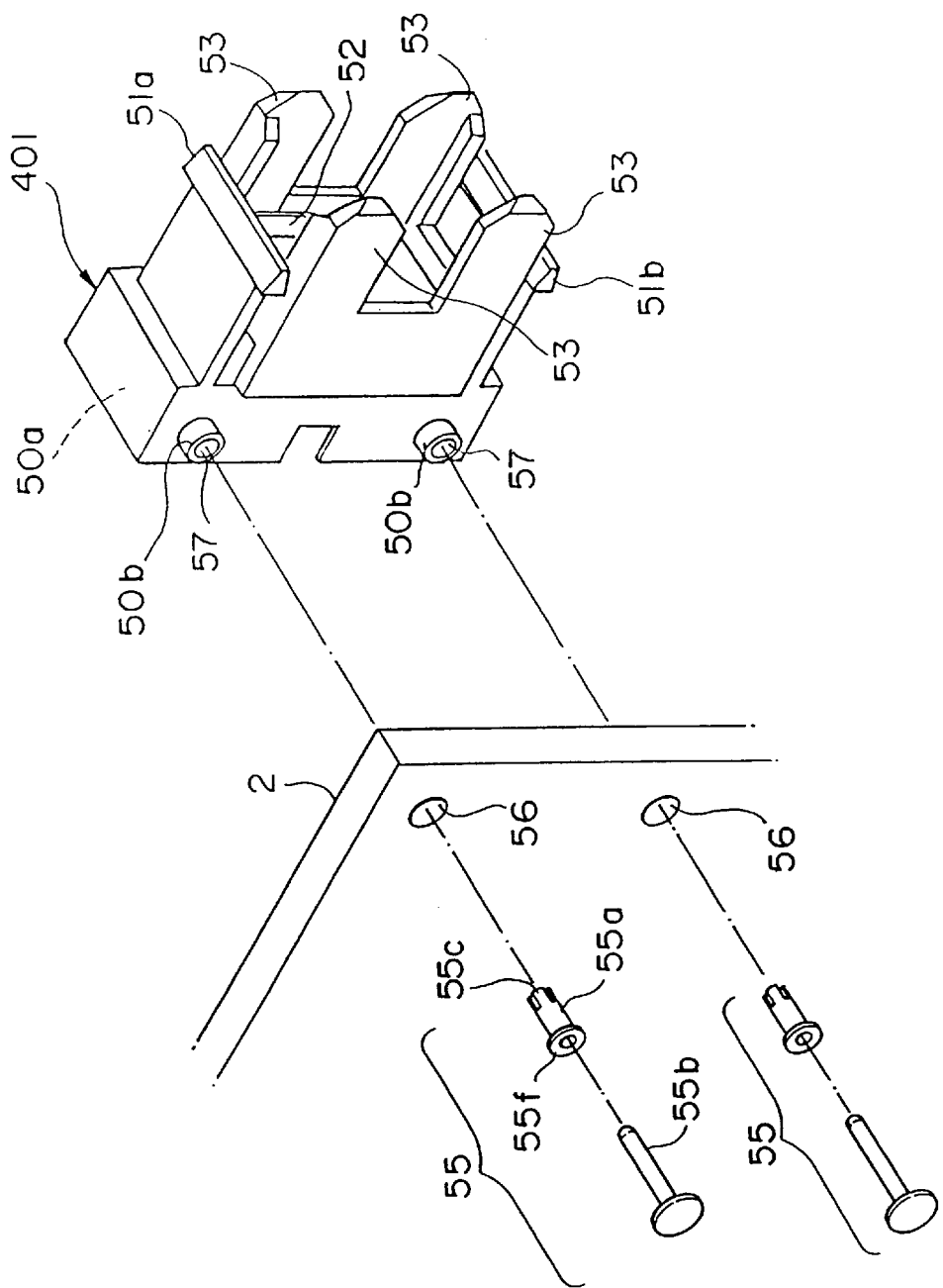
FIG. 26 is an exploded perspective drawing showing the PH housing in FIG. 25 and the rivet parts.

FIG. 26 is a perspective drawing showing the PH housing 401.

In FIG. 26, from both sides of the PH housing 401 (from top to bottom in FIG. 26), a pair of release claws 51a and 51b project to detachably engage the housing body 21 (refer to FIG. 25) from the outside. In addition, as shown in FIG. 26, inside the PH housing 401, a sleeve shaped accommodating wall 52 is provided. On this accommodation wall 52, the MPO plug 4a is inserted from the back (the left inner side in FIG. 26) and engaged. In addition, at the end in the direction of insertion (the right front side in FIG. 26) of the PH housing 401 into the BH housing 20a, a double wall 53 projects.

Figure 25:
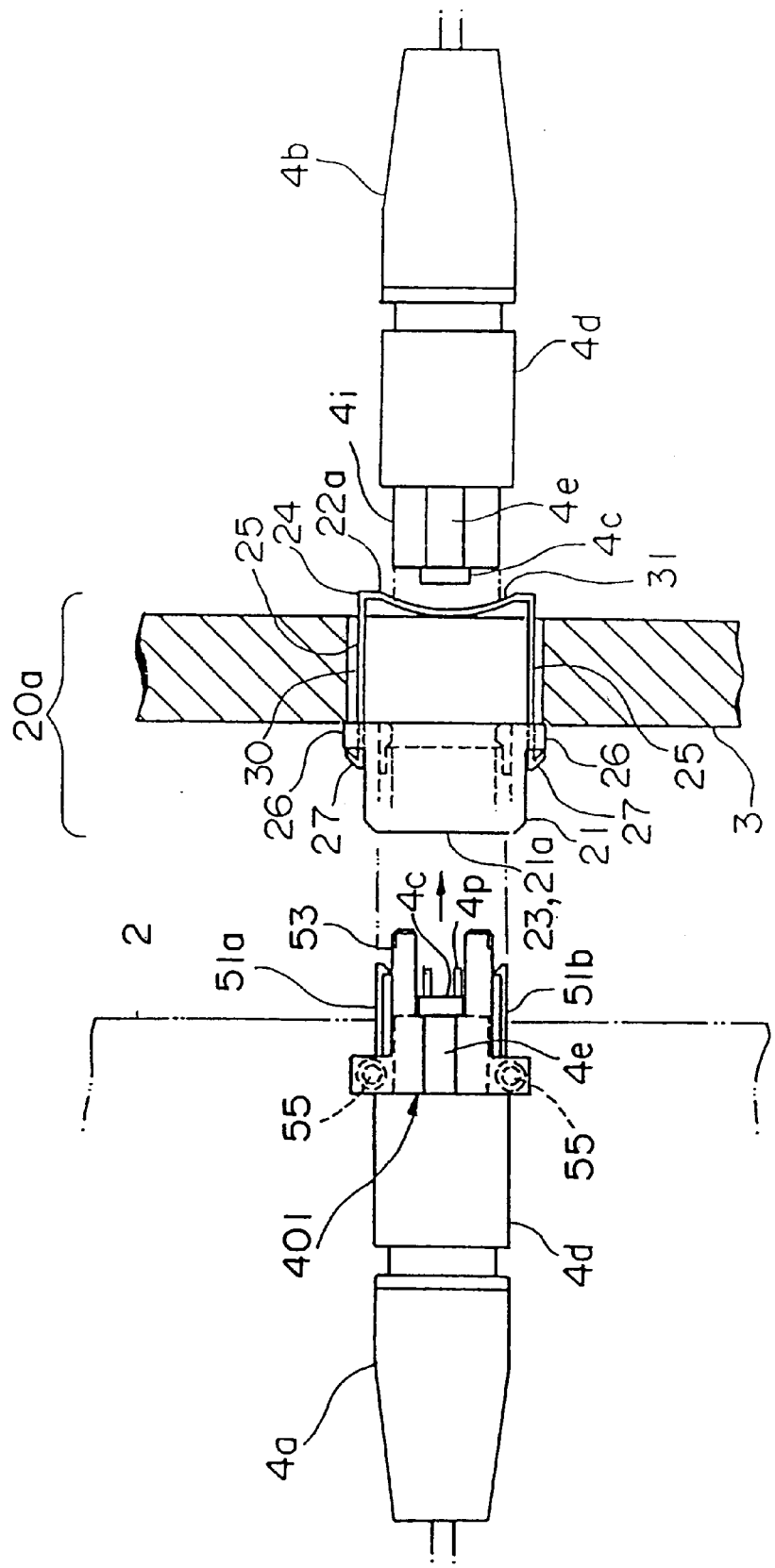
FIG. 25 is a side view showing the optical connector (BP connector) using the PH housing whose installation structure on the printer board has been improved.

As shown by the arrow in FIG. 25, when the PH housing 401 is inserted into the BH housing 20a, this double wall 53 is inserted towards an insertion groove (not shown) maintained in the gap between the housing body 21 and the internal housing 21a that is accommodated within this housing body 21, and therefore, the PH housing 401 is positioned toward the BH housing 20a. In addition, at this time, the double wall 52 overlaps the outer surface of the internal housing 21a, and reinforces the internal housing 21a and the housing body 21. The PH housing 401 inserted into the BH housing 20a can be inserted up to the position where the accommodation wall 52 (refer to FIG. 26) abuts the internal housing 21a.

When the MPO plug 4a is inserted into the PH housing 401, the housing in the MPO plug 4a (not shown) can be detachably engaged in the PH housing 401. In addition, the MPO plug 4a can be extracted by releasing the engagement between the housing and the PH housing 401 by the extraction operation (extracting to the left side in FIG. 25) of the coupling 4d. Moreover, the MPO plug 4b can also be detachably engaged with the BH housing 20a.

Figure 27:
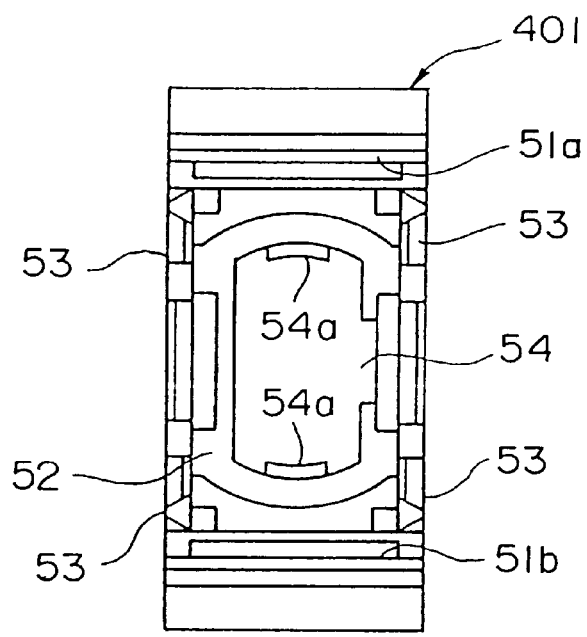
FIG. 27 is a front view showing the PH housing in FIG. 25.

As shown in FIG. 27, a key groove 54 is formed in the accommodation wall 52 of the PH housing 401, and by the key 4e (refer to FIG. 25) of the MPO plug 4a engaging this key groove 54, the MPO plug 4a is positioned at a specified position within the PH housing 401. As shown in FIG. 25, the MPO plug 4b inserted from the installation hole 30 side also has a key 4e, and by this key 4e engaging the key groove 21b (refer to FIG. 11) in the internal housing 21a, it can be positioned at a specified location within the BH housing 20a. In addition, when the PH housing 401 is engaged with the BH housing 20a, due to the positioning between the PH housing 401 and the BH housing 20a and the positioning due to the engagement between the key 4e of each MPO plug 4a and 4b and the key groove 21b of the internal housing 21a, the MPO plugs 4a and 4b are positioned together, and the optical connector ferrules 4c and 4c of these MPO plugs 4a and 4b are positioned and abutment connected. When the PH housing 401 is correctly engaged in the BH housing 20a, the guide pin 4p of one optical connector ferrule 4c can be smoothly inserted and engaged in the guide pin hole of the other optical connector ferrule 4c.

Moreover, reference numeral 54a in FIG. 27 is an engaging claw that detachably engages the MPO plug 4a.

The MPO plugs 4a and 4b have a built-in urging means (not shown) such as a coil spring that urges the optical ferrules 4c, and when the MPO plugs 4a and 4b are connected together, the urging force of these urging means acts as an abutting force between the optical connector ferrules 4c and 4c, and thus the abutment force between the abutment connected optical connector ferrules 4c and 4c acts very efficiently.

Figure 28:
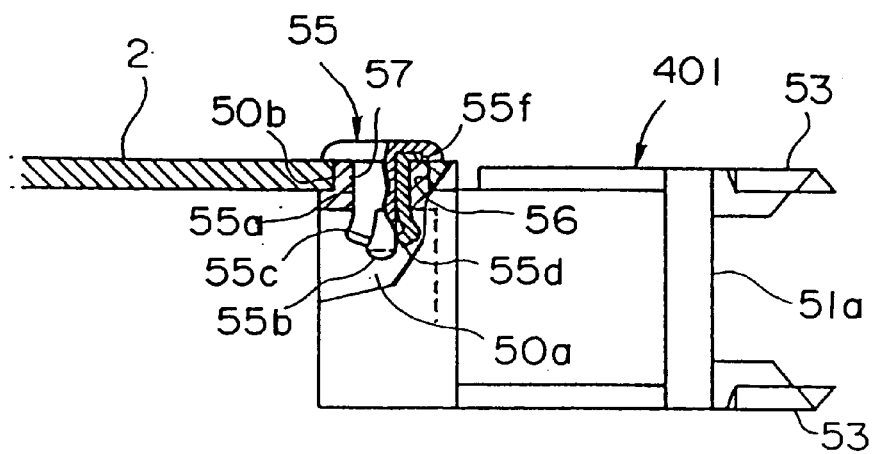
FIG. 28 is a planar drawing showing the PH housing in FIG. 25.

As shown in FIG. 26, the rivet 55 that anchors the PH housing 401 to the printed board 2 comprises a sleeve shaped rivet body 55a made of a synthetic resin such as plastic and a rivet pin 55b made of synthetic resin and inserted into the rivet body 55a. As shown in FIG. 26 and FIG. 28, in the method using the rivet, first, the rivet body 55a inserted into the rivet hole 57 of the PH housing 401 through the rivet hole 56 in the printed board 2 reaches the deformation space 50a (refer to FIG. 28) of the PH housing 401. Next, the rivet hole 55b is pressed into the rivet body 55a from the printed board 2 side (one end in the axial direction of the rivet body 55a), and when the end of this rivet hole 55b reaches the deformation part 55c shaped by partitioning the other end of the rivet body 55a in a plurality of locations making slits in the axial direction, the projections 55d projecting on the inside of each partitioned part of the deformation part 55c are pressed, and the deformation part 55c is deformed so as to spread out radially to the outside. Thereby, the PH housing 401 and the printed board 2 are anchored by being held between the engaging projection 55f (the flange part) projecting from the one end of the rivet body 55a in the radial direction and this deformation part 55c.

When the rivet body 55a communicates with the respective rivet holes 56 and 57 of the printed board 2 and the PH housing 401, the engaging flanges 50b of the PH housing 401 projecting in the vicinity of the rivet holes 56 are engaged in advance in the rivet holes 56 of the printed board 2, the communicating state of both rivet holes 56 and 57 of the PH housing 401 side and the printed board 2 side is maintained, and thus the insertion operation of the rivet body 55a is simple.

After the rivet body 55a having the rivet pin 55b, inserted in advance only to a depth such that the deformation part 55c does not open, communicates with the rivet holes 56 and 57, the deformation part 55c is pressed open by increasing the amount of pressure on the rivet pin 55b towards the PH housing 401, and thereby the printed board 2 and the PH housing 401 can be anchored. At this time, at the work location, because the rivet part 55a having the rivet pin 55b inserted can be treated as one part, the operability of the anchoring is improved.

Moreover, the material of the rivet part 55 is not limited to resin. A wide selection of materials, such as metals, can be used, and the cost can be easily reduced by using inexpensive materials.

Therefore, in the PH housing 401, because the anchoring to the printed board 2 is carried out with the rivet part 55, the anchoring operation can simply be carried out by the insertion operation of the rivet body 55a and the pressure insertion operation of the rivet pin 55b. The operating efficiency is greatly improved compared to anchoring by a small-sized screw as disclosed in the related art. In addition, with the anchoring by the above-described screw, cost reduction is difficult because the screw is a special order part, and thus the processing of the PH housing 401 becomes special, which prevents cost reductions of the optical connector as a whole. If it is anchored by the rivet part 55, the cost of the rivet part 55 can be easily reduced, and thus, the reduction of the cost of the optical connector as a whole is possible because processing of the PH housing 401 is simple.

Figure 29:
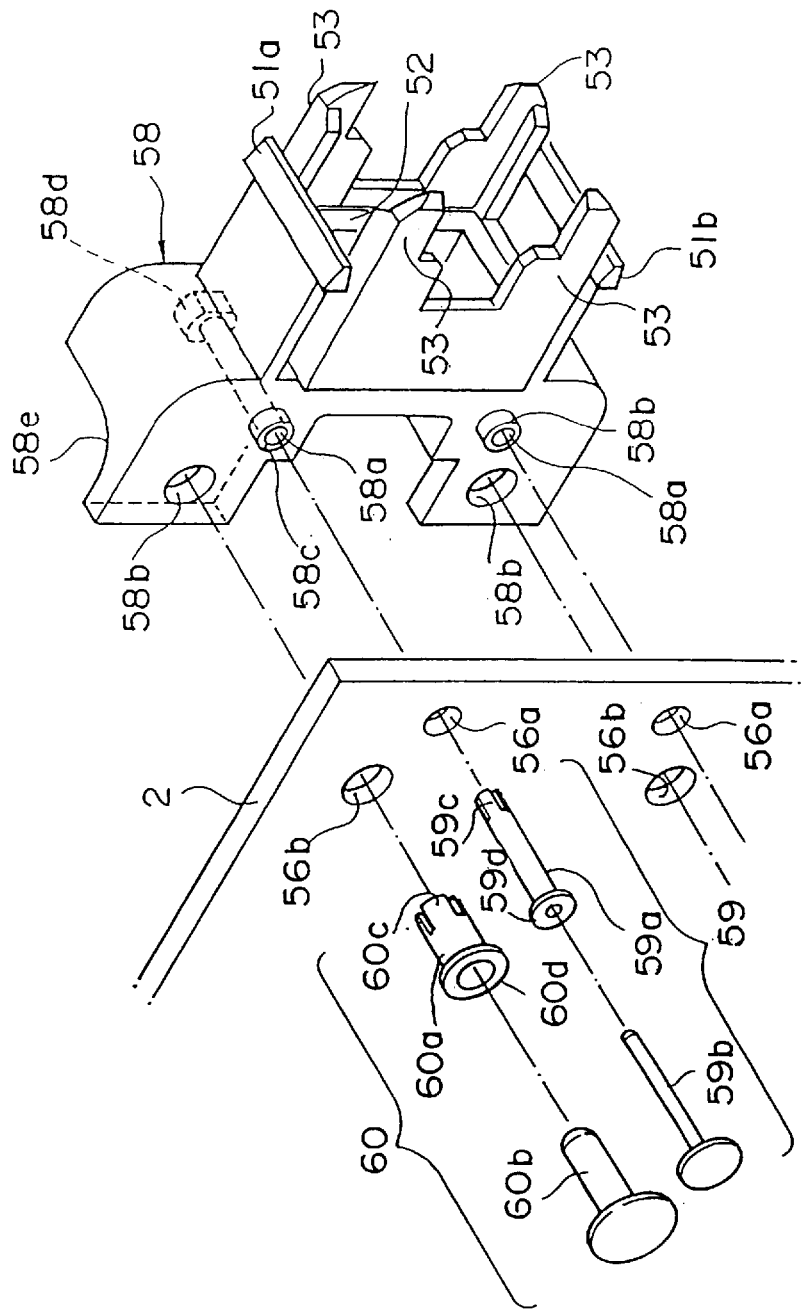
FIG. 29 is an exploded perspective drawing showing a different PH housing whose installation structure on the printer board has been improved.
Figure 30:
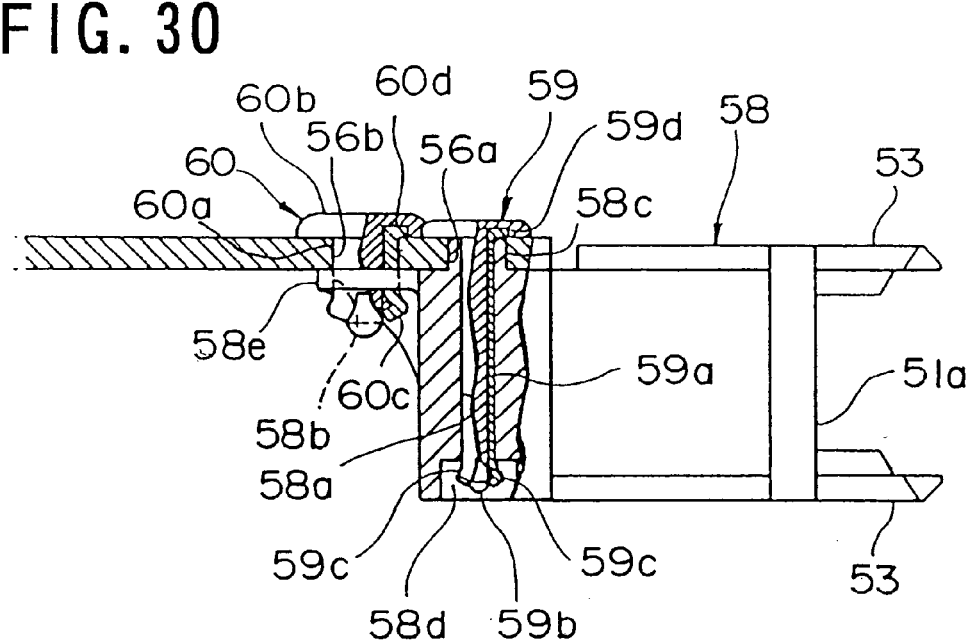
FIG. 30 is a planar drawing showing the PH housing in FIG. 29.

Furthermore, FIG. 29 and FIG. 30 show the PH housing 58 having a total of four rivet holes 58a and 58b. As shown in FIG. 29, on the printed board as well, there are a total of four rivet holes 56a and 56b corresponding to these rivet holes 58a and 58b.

Engaging flanges 58c project in the vicinity of the openings of the rivet holes 58a, and by engaging these engaging flanges 58c in the rivet holes 56a of the printed board 2, the PH housing 58 can be positioned at a specified position on the printed board 2.

As shown in FIG. 29 and FIG. 30, the rivet part 59 that communicates with the rivet holes 56a and 58a provides a sleeve-shaped rivet body 59a and a rivet pin 59b that is pressure inserted into this rivet body 59a from the one end in the axial direction, which is the back end in the direction of insertion into these rivet holes 56a and 58a. A deformation part 59c is formed at the other end in the axial direction, which is the front end of the rivet body 59a in the direction of the insertion into the rivet holes 56a and 58a. Its end is inserted into a deformation space 58d (expanded part) whose end opposite to the engaging flange 58c of the rivet hole 58a expands. In addition, when the rivet pin 59b is pressure inserted into the rivet body 59a, the deformation part 59c deforms so as to spread to the outside, and thereby the PH housing 58 and the printed board 2 are held between this deformation part 59c and the engaging projection 59d of the rivet body 59a.

The rivet holes 58b pass through the bearing flange 58e projecting towards the backside (the left side in FIG. 30) from the PH housing 58. The rivet part 60 communicating with the rivet holes 56b and 58b provide a sleeve-shaped rivet body 60a and a rivet pin 60b pressure inserted into the rivet body 60a. In addition, the deformation part 60c, which is inserted from the printed board 2 side and passes through the rivet hole 58b of the bearing flange 58e to project to the opposite side of the bearing flange 58e away from the printed board 2, is deformed by being pushed apart towards the outside by a rivet pin 60b that is pressure inserted into the rivet body 60a, and thereby the PH housing 58 and the printed board 2 are held between this deformed part 60c and the engaging projection 60d of the rivet body 60a.

Here, as shown in FIG. 29, the rivet hole 58b has a diameter larger than the rivet hole 58a, and the rivet body 60a of the rivet part 60 that communicates with the rivet holes 56a and 58a has an external diameter larger than the rivet body 59a of the rivet part 59 communicating with the rivet holes 56a and 58a. In addition, the rivet body 60a of the rivet part 60 applied to the rivet holes 56b and 58b has a length that is shorter than that of the rivet body 59a of the rivet part 59 using the rivet holes 56a and 58a. In this manner, the diameter and length dimensions of the rivet parts 59 and 60 are altered as convenient to conform to the shape of the rivet holes 58a and 58b. When changing the dimensions of the diameter and length of the screws of the special order parts disclosed in the related art, labor is involved in forming the screw groove, while in contrast the rivet parts 59 and 60 can be easily made to correspond simply by forming them to the desired shape using resin, and thus they obtain a wide applicability and can be reduced in cost. Furthermore, in the case of using screws, labor is involved because the screw holes formed on the PH housing 58 side must be changed according to the shape of the screw, whereas in contrast with the rivet parts 59 and 60, it is only necessary to form of the rivet holes 58a and 58b for the insertion of the rivet parts 59 and 60 in the PH housing 58, and thus the production efficiency of the PH housing 58 is increased.

In addition, the supporting flange 58e can be formed at a position other than the back of the PH housing 58. For example, the supporting flanges can project at a plurality of locations on the PH housing 58, various rivet parts used in the rivet holes in each of these supporting flanges, and the PH housing 58 installed on the printed board 2. In this case, because rivet holes passing through the PH housing 58 are unnecessary, the design of the PH housing 58 is simplified. In addition, in the case that rivet holes are formed in the supporting flanges, because aligning the rivet hole shapes is simple and rivet parts having identical dimensions can be used, the processing efficiency of the rivet holes and the production efficiency of the rivet parts can be improved and a greater cost reduction becomes possible.

In, this manner, if the supporting flanges projecting from the PH housing 58 or the rivets inside the PH housing 58 are formed, the PH housing 58 can be anchored to the printed board by using rivet parts, so the design changes are simple and great flexibility can be attained.

With the optical connector using this PH housing 58, because the anchoring force of the PH housing with respect to the printed board 2 can be sufficiently guaranteed, even in the case that the resistance force produced during the engagement operation and the release operation between the PH housing 58 and the BH housing 20a is high, there is no concern about producing misalignment, etc., in the PH housing 58. Due to this, even when generation of a large resistance force is anticipated during engagement and release, as when using large-sized PH housing and BH housing, for example, in connecting large sized MPO plugs having many corresponding cores, the PH housing can be stably supported at a specified position, and the operations of connecting and releasing the MPO plugs can be carried out smoothly.

Moreover, the formation position, size, number, etc., of rivet holes in the printed board and the rivet holes in the PH housing, the shape of the deformation space for deforming the rivets, etc., are not limited to those illustrated in the above-described embodiment, and can be altered as appropriate.

Figure 31:
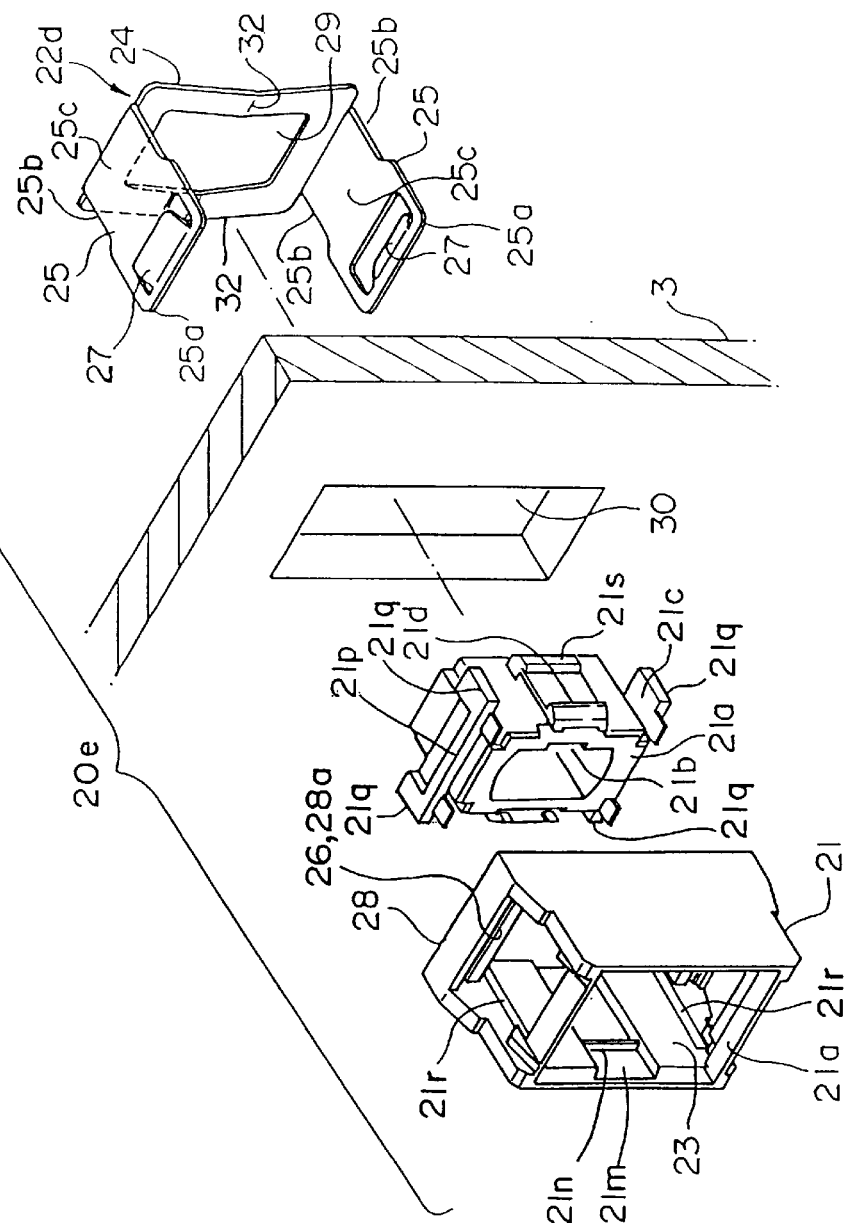
FIG. 31 is an exploded perspective drawing showing the PH housing using the fixed part having the constricted part formed part of the way along the flexible claws.

As shown in FIG. 31, the fixed part 22d can also be used with this optical connector.

Figure 32:
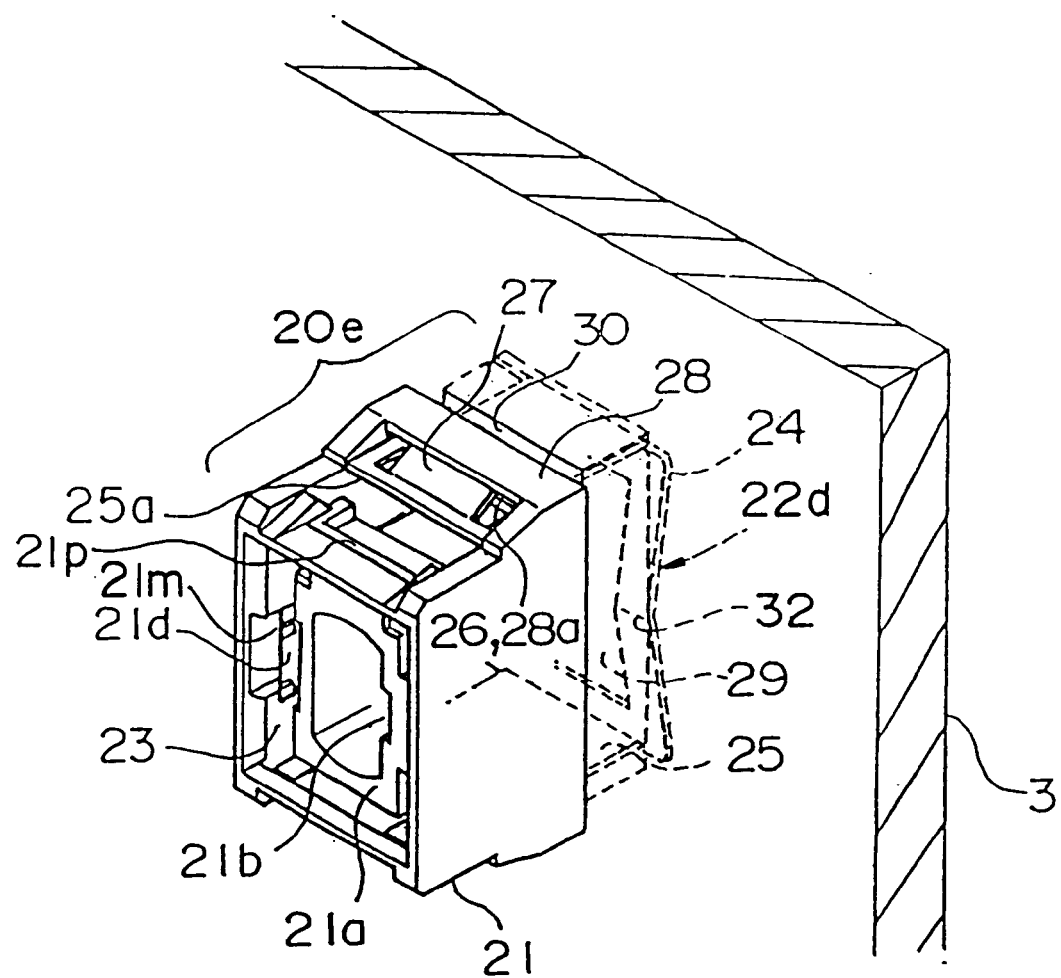
FIG. 32 is a perspective drawing showing the assembled state of the BH housing in FIG. 31.

As shown in FIG. 31 and FIG. 32, the BH housing 20e provides a housing body 21 and fixed part 22d.

On the surface of the housing body 21 facing the PH housing 5 (the left front side in FIG. 31), a tapering surface 21a that guides the PH housing 5 into the plug accommodation hole 23 is formed in the vicinity of the plug accommodation hole 23. Moreover, as shown in FIG. 31, because the internal housing 21a is inserted from the backplane 3 into the housing 21 by the guide projections 21q, respectively projecting from the positioning projections 21c on the four corners, being inserted into the guide groove 21r formed in the housing body 21, the insertion of the internal housing 21a does not produce shifting and is carried out smoothly. In addition, the internal housing 21a can attain a stable accommodation state without producing shifting in any direction except the radial direction of the housing body 21 due to the guide projection 21q accommodated in the guide projection 21p even after being accommodated in the housing body 21. In addition, since the projection-shaped positioning part 21s projecting from the engaging claws 21d on both sides of the internal housing 21a is inserted into the engaging groove 21m in the housing body 21, it contributes to preventing shifting of the internal housing 21a in the housing body 21. This positioning part 21s will be explained in detail in FIGS. 34 and 35 described below.

The whole fixed part 22d is formed from a spring material, and provides a body 24 having an elongated frame shape, and a pair of flexible claws 25 and 25 that project from both sides in the longitudinal direction (top to bottom in FIG. 31) of the body 24. The projection position of these flexible claws 25 and 25 conform to the pair of engaging holes 26 and 26 formed on both sides opposite to the housing body 21 (there is also an engaging hole 26 on the lower side of the housing body 21 in FIG. 31 and FIG. 32).

The flexible claws 25 and 25 have a flat spring shape, and the engaging claws 27 project from the end 25a in the projection direction of each flexible claw 25 and 25. A constricted part 25c formed more narrowly than this end part 25a by constrictions 25b and 25b formed on both surfaces is provided between this end part 25a and the body 24.

As shown in FIG. 32, both flexible claws 25 and 25 engage engaging claws 27 on the engaging parts 28 and 28 of the housing body 21 by passing through the installation hole 30 of the pack plane 3 and being respectively inserted into the engaging holes 26 and 26 of the housing body 21 provided on the opposite side via the backplane 3.

The body 24 of the fixed part 22d is larger than the installation hole 30, and the plug insertion hole 29 in the center of the body 24 is smaller than the installation hole 30. As shown in FIG. 32, with the assembled BH housing, the backplane 3 can be gently held by a clamp force that allows sliding between the spring part 32 formed on the body 24 of the fixed part 22d and the housing body 21. The spring part 32 connects both flexible claws 25 and 25, and is shaped by forming the body 24 extending on both sides adjacent to the plug insertion hole 29, into an angled or curved shape (an angular shape in FIG. 31 and FIG. 32), and the part that projects the furthest therefrom abuts the backplane 3. Due to the tensile force of this spring part 32, a clamping force is provided that holds the backplane 3 between the fixed part 22d and the housing body 21. In addition, when the fixed part 22d engages the housing body 21, the installation state of the housing body 21 is stabilized because the difference in the thickness dimension of the backplane 3 is offset within the range of flexible deformation of the spring body 32.

Figure 33A:
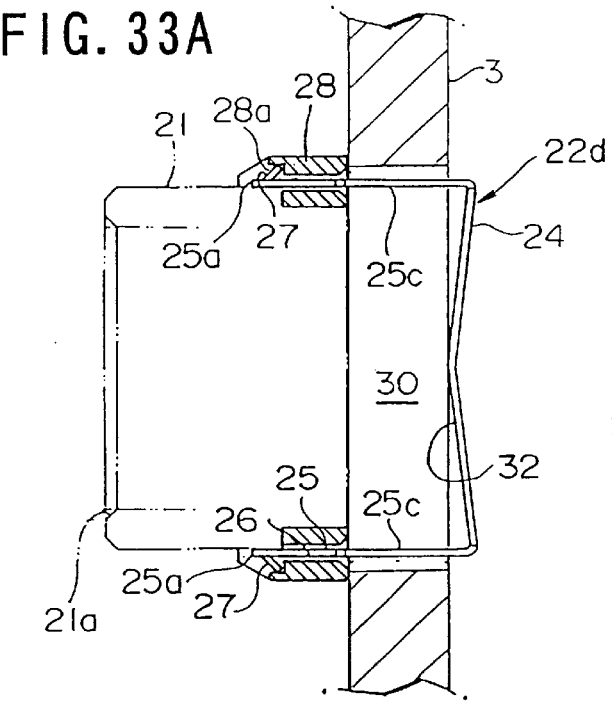
FIG. 33A is a side cross-sectional drawing showing the fixed part of the BH housing in FIG. 32.

In addition, the ends 25a of both flexible claws 25 and 25 have dimensions approximately conforming to the vertical direction of the installation hole 30. As shown in FIG. 31, the constricted part 25c narrows by a step of about, for example, 0.4 mm on each side, or a total of 0.8 mm for both sides, with respect to the flexible claw ends 25a and 25a. As shown in FIG. 32, when the flexible claws 25 and 25 are engaged in the engaging parts 28 and 28 of the housing body 21 by being inserted into the installation hole 30, as shown in FIGS. 33A and 33B, the constricted part 25c is positioned in the installation hole 30, clearance is secured in the vicinity of the constricted part 25c, and the shifting of the flexible claws 25 and 25 within the installation hole 30 is permitted within the range of this clearance. Therefore, on the BH housing 20e installed on the backplane 3, floating is permitted in the range of possible movement of the flexible claws 25 and 25 within this installation hole 30.

For example, this clearance is guaranteed to be about C=1.00 mm or greater in the horizontal direction (refer to FIG. 4), and d=1.60 mm in the vertical direction. Within the range of this clearance, the flexible claws 25 and 25 can shift, and when either becomes large in comparison to the fixed part 22 shown in FIG. 1, the floating range of the BH housing 20 can be adequately set. The floating range of the BH housing 20e becomes remarkably large compared to the case of not forming a constricted part 25c on the flexible claws 25 and 25. Thereby, when the PH housing 5 is engaged in the BH housing 20e by inserting the printed board 2 into the plug-in unit 1 (refer to FIG. 46), the misalignment between the PH housing 5 and the BH housing 20e is offset by the floating of the BH housing 2e, and the engagement operability is improved.

In FIG. 31, because the amount of tapering (dimension f-dimension g in FIG. 22B) of a tapered surface 21a in the horizontal direction on both sides of the housing body 21 is 1.275, when the PH housing 5 is inserted into the plug accommodation hole 23, at most a misalignment of approximately 0.5 mm is tolerated in either the horizontal or vertical directions between the BH housing 20e and the PH housing 5, and for a misalignment within this range, the PH housing 5 can be inserted into the BH housing 20e, and there is a high flexibility with respect to misalignment.

The amount of tapering can be selected according to convenience, and of course can be larger than 1.275.

Figure 33C:
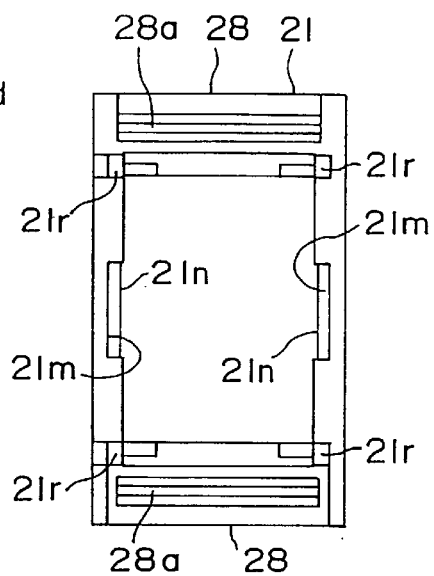
FIG. 33C is a side drawing viewing the housing body of the BH housing in FIG. 32 from the backplane side.
Figure 33B:
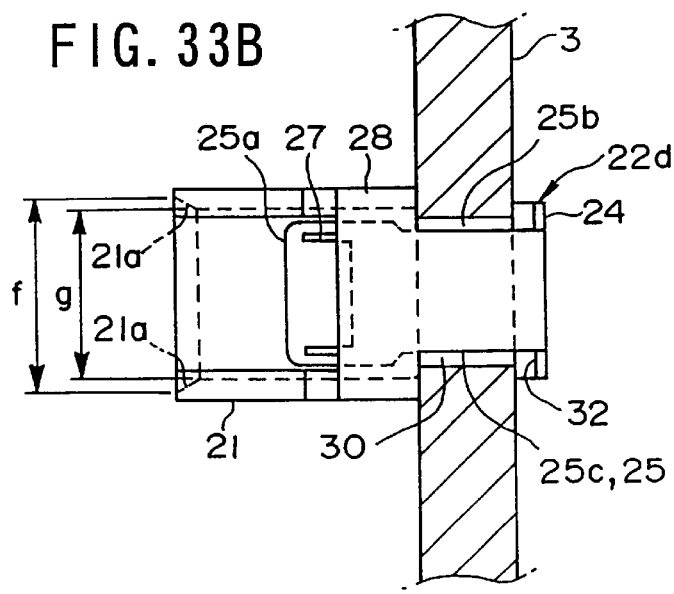
FIG. 33B is a bottom view showing the fixed part of the BH housing in FIG. 32.

As shown in FIG. 31 and FIG. 33, the engaging part 28 of the housing body 21 has a groove-shaped engaging concave part 28a. This engaging concave part 28a is an angular grove shape, and each of the engaging claws 27 of the flexible claws 25 and 25 engage on this engaging part 28 so as to be inserted into the corner part of this engaging concave part 28a, and thus the inadvertent falling out or deformation of the engaging claws 27 is prevented. Thereby, even if the BH housing 20e floats, the engaging claws 27 are not easily detached from the engaging parts 28. To the extent that the engaging claws 27 are not intentionally deformed, the housing body 21 will not detach from the flexible claws 25 and 25, and thereby, on the BH housing 20e, the extraction resistance force is sufficiently guaranteed when the PH housing 5 is extracted.

In addition, the clearance in the vicinity of the flexible claws 25 and 25 inserted in the installation hole 30 can be easily adjusted simply by adjusting the shape of the flexible claws 25 and 25, and thus the floating range of the BH housing 20e can be easily set. Thereby, the shape of the installation hole 30 can be made simple, and its formation operability can be improved. Concretely, due to the indentations 25b formed in the flexible claws 25, the shape of the constricted part can be adjusted, and the desired clearance can be easily obtained. Moreover, the shape forming the indentations 25b and 25b on both sides of the constricted part 25c may be placed only on the projecting sides, and in this manner the displacement limit of the BH housing 20e in a specified direction can be set, and for example, can correspond to the misalignment of the PH housing 5 in a specified direction with respect to the BH housing 20e.

In this manner, when sufficient clearance can be attained due to the shape of the indentations 25b, the floating range of the BH housing 20e becomes large, the engagement operability, of the PH housing 5 can be improved, the misalignment, etc., of the pre-installed printed board 2 with respect to the PH housing 5 can be broadly compensated, and the flexibility improved. Furthermore, with this optical connector, because the end part 25a of a flexible claw is larger than the constricted part 25c, the engaging force with respect to the housing body 21 can be guaranteed, and inconveniences such as excessive shifting in the BH housing 20e due to the insufficiency of the force holding the backplane 3 between the spring part 32 of the fixed part 22d and the housing body 21 can be prevented.

Figure 34:
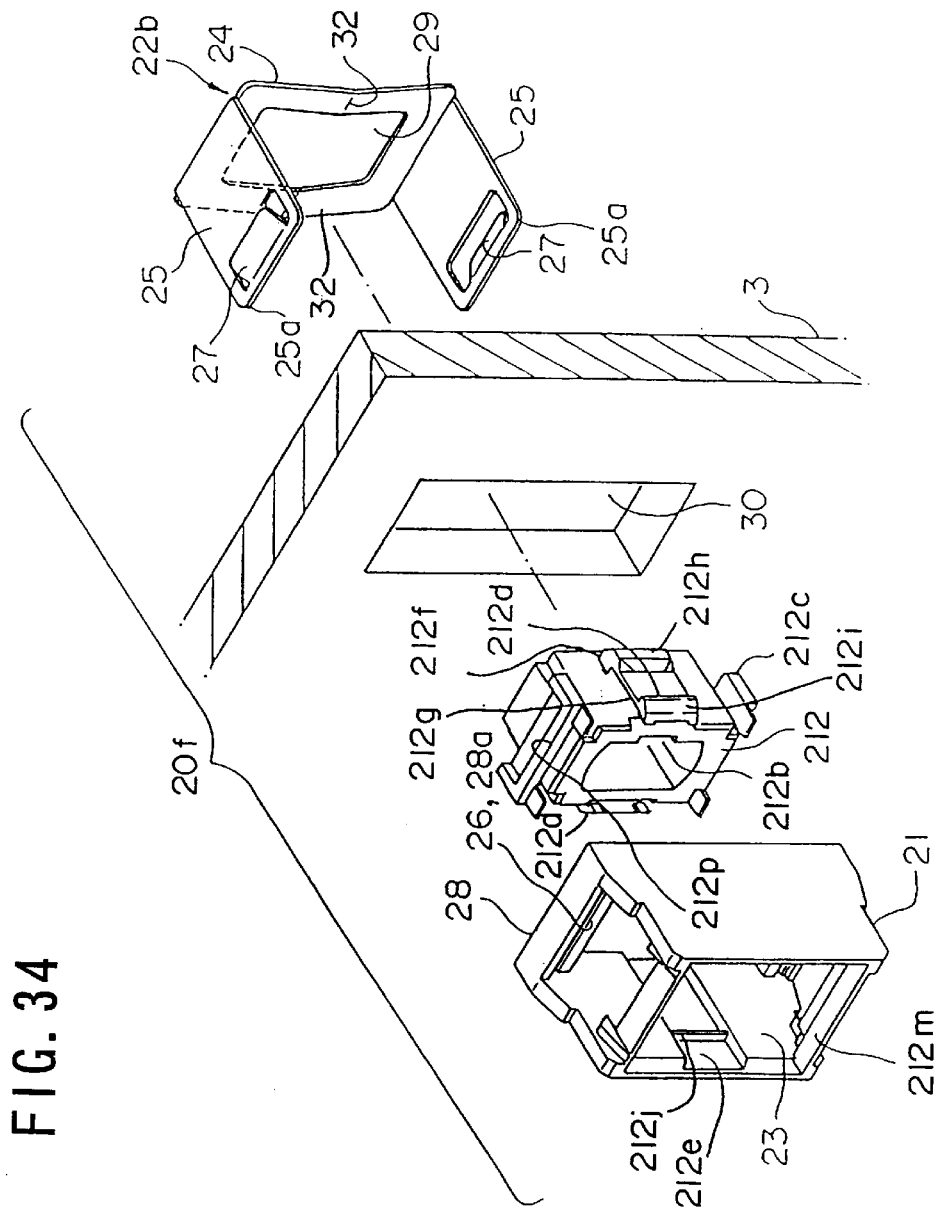
FIG. 34 is an exploded perspective drawing showing the optical connector (backplane connector) using the internal housing having projections extending on the side as a positioning part.
Figure 35:
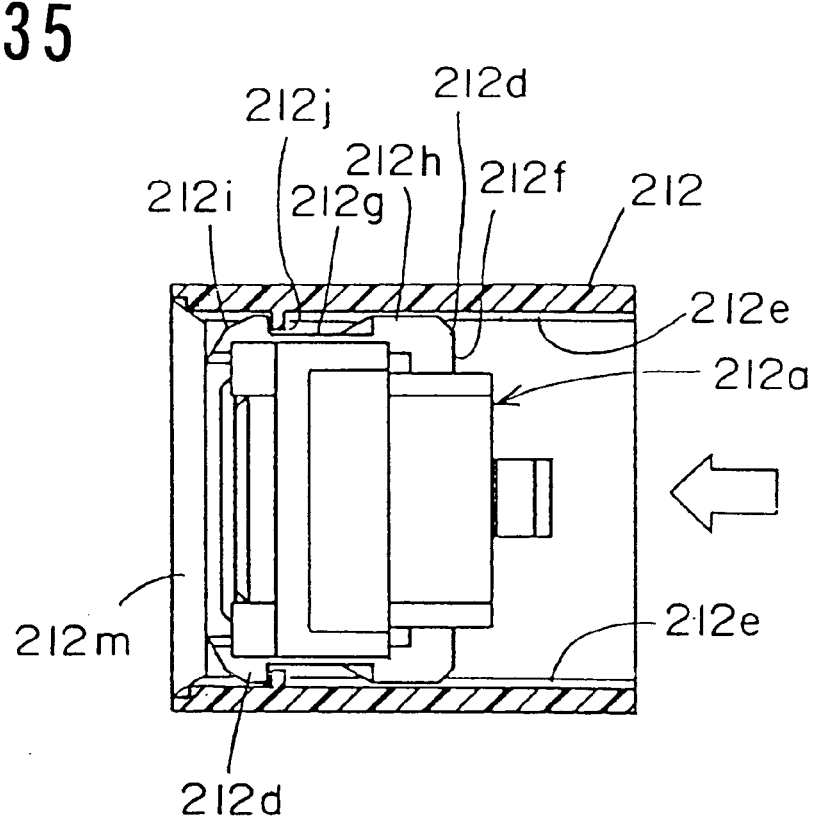
FIG. 35 is a planar cross-sectional drawing showing the state of the internal housing in FIG. 32 inserted into the housing body.

In addition, with this connector, because smooth movement of the internal housing accommodated in the housing body 21 in the axial direction of the housing body 21 is allowed, while shifting in any other direction is reliably repressed, the structure shown in FIG. 34, and FIG. 35 can be used.

As shown in FIG. 34, the function of the engaging claws 212d on both sides (left to right in FIG. 34) of the internal housing 212, the positioning projection 212c and the external projection 212p projecting from both the top and bottom lower part (top to bottom in FIG. 34) is the same as the engaging claws, the positioning projection, and the external projection of the internal housing shown in FIG. 1.

FIG. 35 is a planar cross-sectional drawing showing the insertion state of the internal housing 212 in the housing body 21.

In FIG. 35, the engaging claw 212d provides a projecting part 212f that projects from the side of the internal housing 212 and a parallel part 212g that extends from this projection part 212f along the axial direction of the opening in the center of the internal housing 212, and is formed in the shape of an L. From the base of the parallel part 212g near the joint with the projecting part 212f, a projection-shaped positioning part 212h projects towards the outside.

This engaging claw 21d is made of resin, is integrally formed on the internal housing 21, and is flexible.

In FIG. 35, the internal housing 212 is inserted into the housing body 21 by movement in the direction of the arrow (from right to left in FIG. 35). At this time, the engaging claw body 212i at the end of this parallel part 212g is inserted into the engaging groove 212e, and by riding over the partition wall 212j projecting with in this engaging groove 212e, is engaged in the engaging groove 212e. The engagement of the engagement claw body 212i with respect to the engagement groove 212e is not easily detached, and in addition, the positioning part 212h in engaged by insertion into this engaging groove 212e, and is not easily detached from the engaging groove 212e. Thereby, due to the positioning projection 212c, the engaging claws 212d on both sides, and the positioning parts 212h, the internal housing 212 does not shift within the housing body 21 in any direction other than the direction axial to the housing body 21, and is stabilized at a specified position.

In addition, compared to the case when only the engaging claw body 212i abuts the inner surface of the housing body 21, inconveniences such as the movement of the internal housing 21 in a direction axial to the housing body 21 jamming midway do not occur because both the engaging claw body 212i and the positioning part 212h slide to abut the inner surface of the housing body 21, and the movement becomes smooth. This contributes to the stable movement of the internal housing 212 when the MPO plugs 4a and 4b are being connected, and contributes to increasing the smoothness of the connection operation between the MPO plugs 4a and 4b. Even after this connection, for example, in the case that a pressure is applied from both sides of the MPO plugs 4a and 4b, there is no catching midway in the BH housing in the direction that the pulling force acts, and because the movement is smooth, influence on the connection state can be avoided.

In addition, the positioning part 212h is also positioned in the engaging groove 212e simply by positioning and inserting the engaging claw 212d into the engaging groove 212e because the positioning part 212h is a projection that projects from the engaging claw 212d. At the same time, the engaging claw 212d riding over the partitioning wall 212j engages in the engaging groove 212e because the positioning part 212h is automatically engaged in the engaging groove 212e, and thus even in a narrow housing body 21, the positioning part 212h can be easily engaged in the engaging groove 212e, and the insertion into the internal housing 212 with respect with the housing body 21 can be carried out with high efficiency.

Moreover, the projection position of the positioning part 212h in the engaging claw 212d is not limited to the case of the parallel part 212g, and can be optionally selected as long as the position does not contact the engagement claw body 212i of the end of the engagement claw 212d.

In addition, the positioning unit is not limited to the shape that engages the engaging groove 212e, but, for example, any structure whose shape has a projection inserted into the slit formed on one part of the engaging groove 212e can be used.

As shown in FIG. 34, the BH housing 20f is assembled when the backplane is held between the housing body 21 and the fixed part 22b. This BH housing 20f is stably engaged (FIG. 33A is a detailed drawing of this engaged state) by the engaging claw 27 of the fixed part 22b at the end of the flexible claw 25 entering the engaging concavity 28a of the engaging part 28 of the housing body 21. In contrast, in the internal housing 212 inserted in the housing body 21, there is no shifting, and a stable accommodation state is attained. Because the ends of both MPO plugs 4a and 4b are connected by insertion into the internal housing 212, the floating range of the internal housing 212 is important; in a state wherein shifting of the internal housing 212 in any direction except the axial direction of the housing body 21 is prevented, the amount of floating conforms to that of the BH housing 20f, and the internal housing 212 floats within a floating range set according to the relation between the flexible claws 25 and 25 and the installation hole 30. Therefore, inconveniences such as the degradation of the insertion operability of the MPO plugs 4a and 4b due to the shifting of the internal housing 212 can be prevented, and the operation of connecting together the MPO plugs 4a and 4b by engaging the PH housing 5 in the housing body 21 can be carried out reliably with high efficiency.

In addition, this optical connector can be applied to various the types, shapes, sizes of the MPO plugs 4a and 4b by appropriately selecting and using the internal housing 212 of the housing body 21. That is, when the shape, size, etc., of the particular end of the MPO plugs 4a and 4b are altered, both plugs 4a and 4b should be positioned accordingly, and appropriate ones must be selected and used. However, with the internal housing according to the present invention, even if the design of the internal housing itself is altered, simply by altering the designs of the engaging claws 212d and the positioning part 212h, there will be no shifting with respect to the housing body 21, and a stable insertion state therein can be easily attained.

Thereby, the optical connector according to the present invention attains a high flexibility with respect to the optical connector plugs, and, for example, can be applied to connections between various types of optical connector plugs besides MPO plugs, and connections between different types of optical connector plugs.

Second Embodiment

Figure 36:
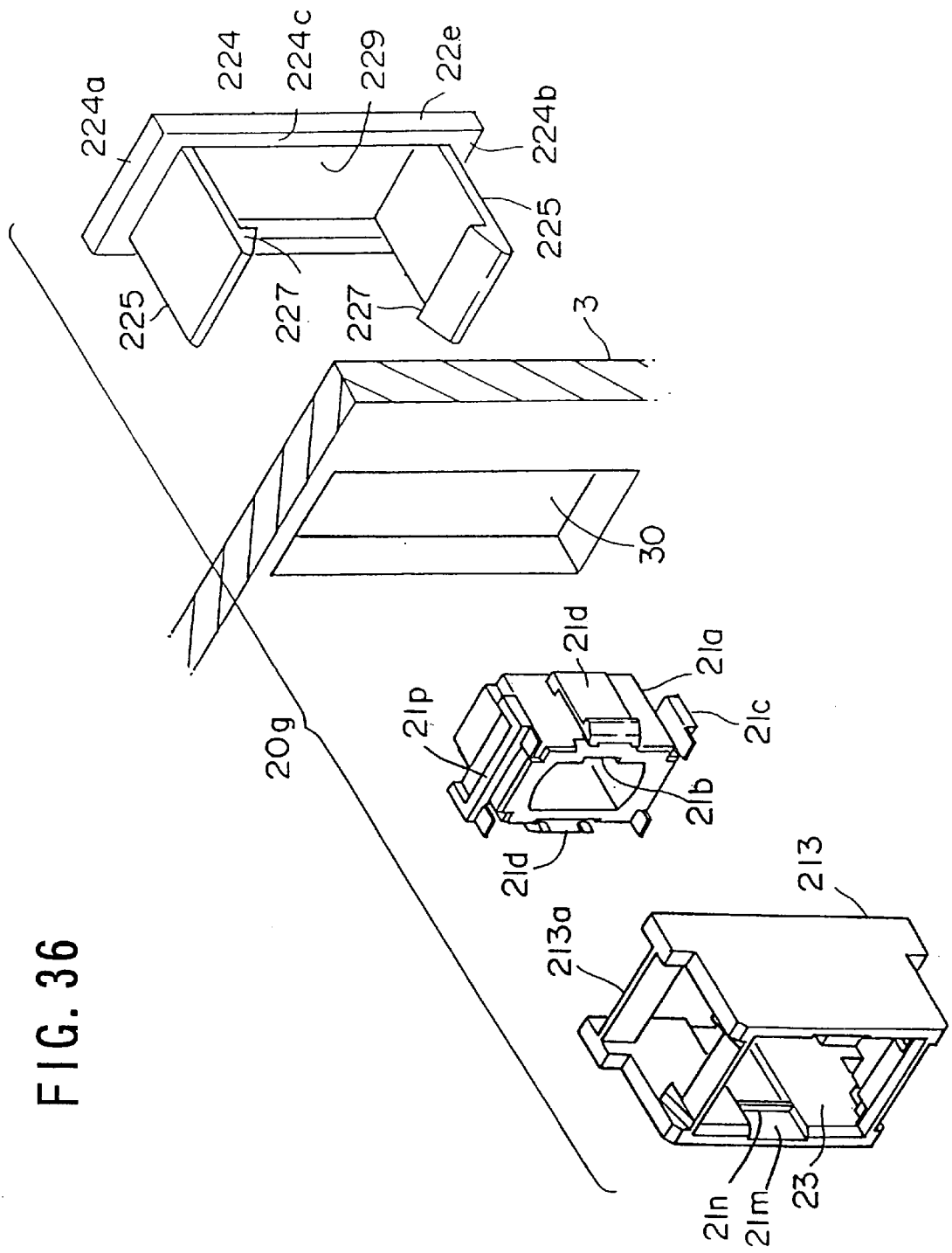
FIG. 36 is a drawing showing the second embodiment of the present invention, and is an exploded perspective drawing showing a BH housing using a fixed part having a structure in which the flexible claws engage from the outside the engaging parts on both sides of the housing body.

As shown in FIG. 36, the housing body 213 that forms the BH housing 20g is formed in a sleeve-shape from a synthetic resin such as plastic, and is identical to the housing body shown in FIG. 1 on the point of providing a plug accommodation hole 23 that accommodates the inserted MPO plugs 4a and 4b, and the point of accommodating the internal housing 21a in the plug accommodation hole 23, but differs from the housing body 21 on the point of providing an engaging part 213a having a different shape from that of the engaging part 28 of the housing body 21.

The fixed part 22e is entirely formed of a synthetic resin such as plastic and having a rectangular shaped frame, and provides a body 224 and a pair of flexible claws 225 and 225 that project from both sides of the body 224. The separation distance between these flexible claws 225 and 225 agrees with the separation distance between the pair of engaging parts 213a and 312a formed on both sides opposite to the housing body 213 (there is also an engaging part 213a on the bottom side of the housing body 213 in FIG. 36 and FIG. 37). In addition, both flexible claws 225 and 225 are formed at a position facing the plug insertion hole 229, and the outer edge 224a of both lengthwise ends of the body 224 project towards the outside of the flexible claws 225 and 225.

Figure 37:
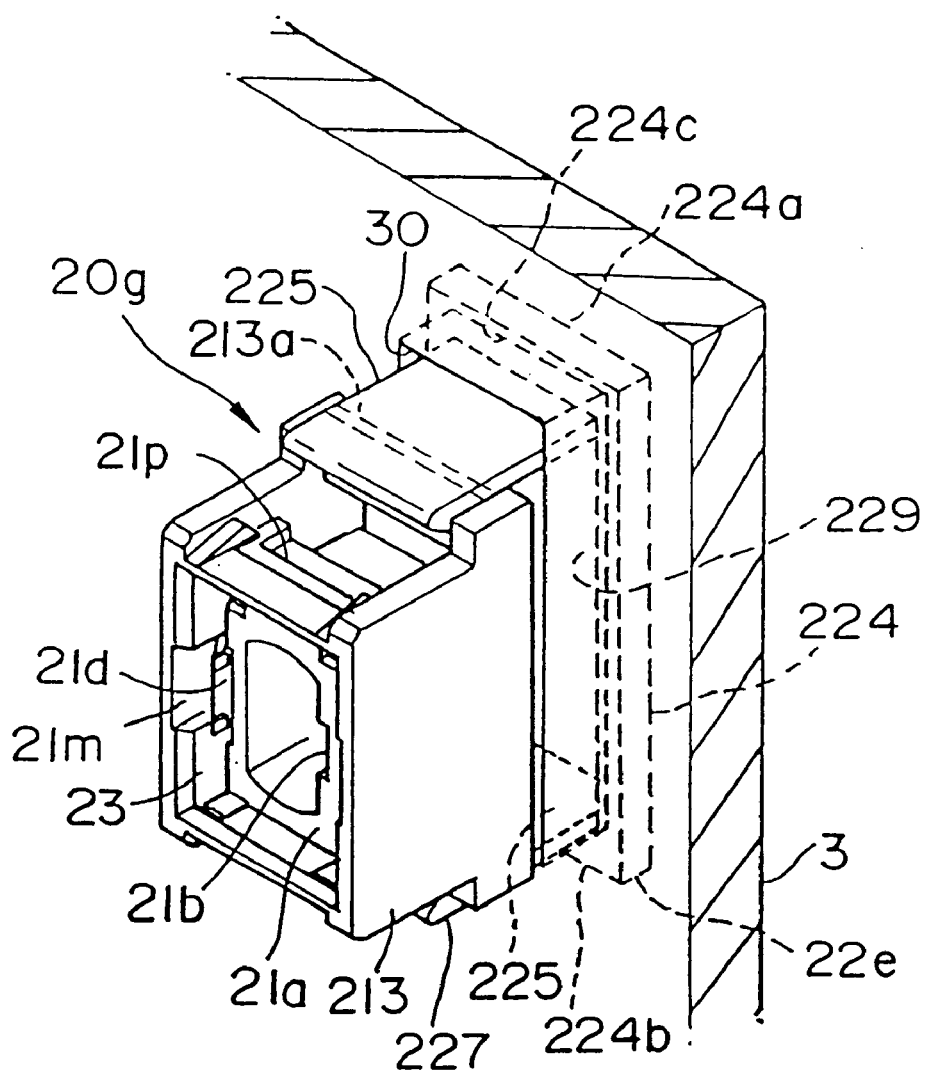
FIG. 37 is a perspective drawing showing the assembled state of the BH housing in FIG. 36.

In FIG. 37, by insertion into the installation hole 30 of the backplane 3, the engaging claws 227 of both flexible claws 225 and 225 engage respectively on both engaging parts 213a and 213a of the housing body 213 set on the opposite side via the backplane 3. Here, the separation distance between both engaging claws 227 and 227 is somewhat smaller than the separation distance between both engaging parts 213a and 213a, and thus the housing body 213 becomes held between both engaging claws 227 and 227, and the engaging claws 227 cannot be easily detached from the engaging part 213a.

Figure 38:
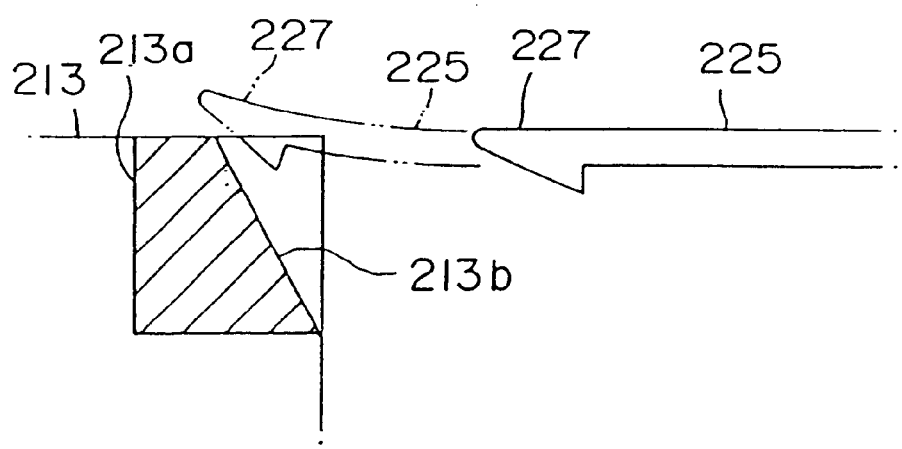
FIG. 38 is an enlarged drawing showing the engagement operation of the flexible claws of the fixed part with respect to the engaging part of the housing body.

Moreover, as shown in FIG. 38, because an inclined surface 213b is formed on the engaging parts 213a and 213a, the flexible claws 225 ride over the inclined surface 213b due to their flexible deformation, and can be easily engaged with the engaging parts 213a simply by inserting the engaging claws 227.

As shown in FIG. 36, the installation hole 30 is rectangular, and extends in the form of a slit along the backplane 3. The external shape of the body 224 of the fixed part 22e is larger than the installation hole 30, and the plug installation hole 229 in the center of the body 224 is smaller than the installation hole 30. As shown in FIG. 37, with the assembled BH housing 20g, the backplane is gently held between the housing body 213 and the body 224 by a clamping force that allows sliding. At this time, the entire body 224, including the external edges 224a and 224b, abuts the backplane 3.

Figure 39:
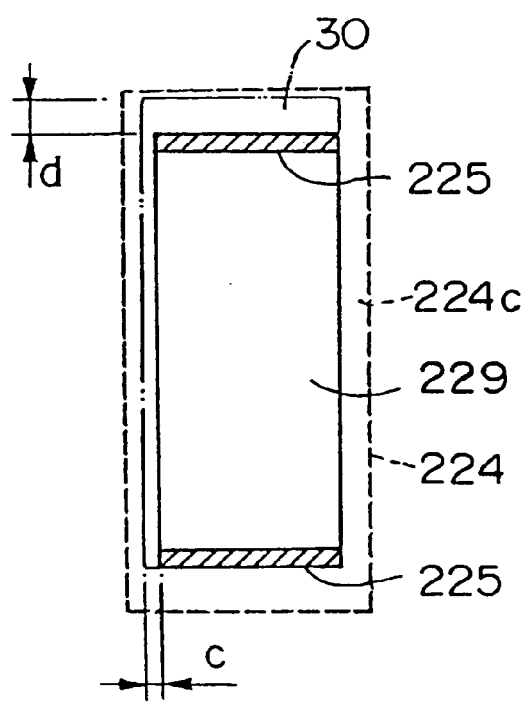
FIG. 39 is a front view showing the clearance secured in the vicinity of the flexible claw in the installation hole the pack plane.

In addition, the clearance is ensured in the vicinity of the flexible claws 225 and 225 inserted in the installation hole 30, and displacement of the flexible claws 225 and 225 in the installation hole 30 within this range of clearance is permitted. Therefore, on the BH housing 20g installed on the backplane 3, the flexible claws 225 and 225 can float in this installation hole 30 within the range of possible movement. For example, a clearance of c=0.34 mm in the horizontal direction (left to right in FIG. 39) and d=1.60 mm in the vertical direction (top to bottom in FIG. 39) is guaranteed, and the flexible claws 225 and 225 can be displaced within the range of this clearance; thus, the floating range of the BH housing 20g is set. Thereby, when the printed board 2 is inserted into the plug-in unit (refer to FIG. 46) and the PH housing 5 is engaged in the BH housing 20g, the misalignment between the PH housing 5 and the BH housing 20g is offset by the floating of the BH housing 20g, and thus engagement operability is improved. At this time, the entire body 224, including the outer edges 224a and 224b, abuts the backplane 3, and thus a large supporting surface area can be guaranteed. Furthermore, the supporting surface 224c of the body 224 that abuts the backplane extends so as to hold the flexible claws 225 and 225, and thus the floating of the BH housing 20 is stabilized, excessive shifting can be repressed, a nd the engagement operability of the PH housing 5 and the BH housing 20 can be improved.

When this BH housing 20g is assembled in the backplane 3, the pair of engaging claws 227 are engaged in the engaging parts 213a and 213a exposed on both sides of the housing body 213 from the outside of the housing body 213, and thus the engagement between the engaging claws 227 and engagement parts 213 can be carried out visually, and the operability is increased.

In addition, simply by adjusting the shape of the flexible claws 225 and 225 (thickness, etc.), the clearance in the vicinity of the flexible claws 225 and 225 inserted in the installation hole 30 can be adjusted easily, and thus the floating range of the BH housing 20g can be easily set. Thereby, the shape of the installation hole 30 can be simple, and the formation operation improved.

Moreover, the present invention is not limited to this embodiment, and for example, the shape, etc., of the engaging part of the housing body can be altered as appropriate.

Third Embodiment

Figure 40:
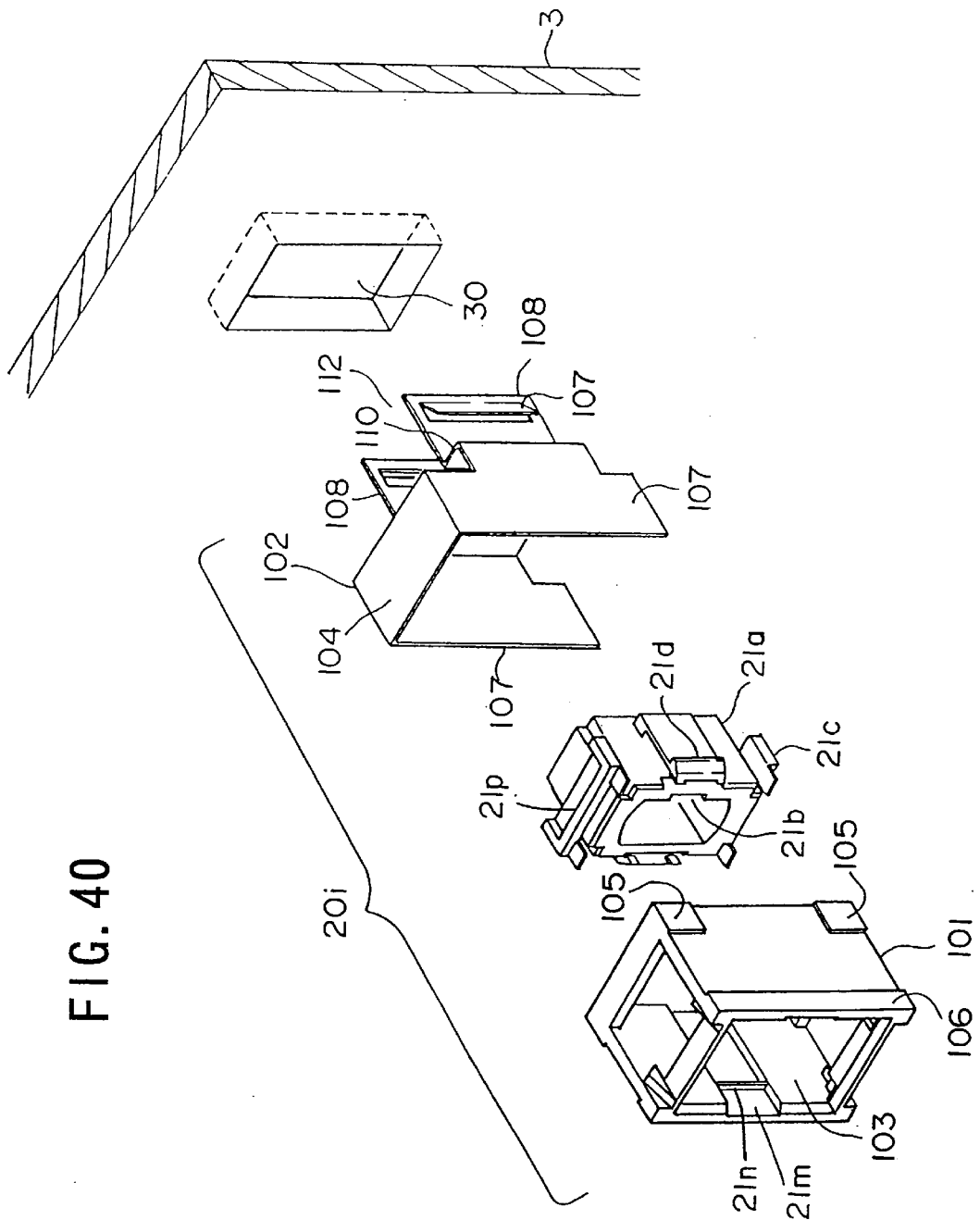
FIG. 40 is a drawing showing the third embodiment of the present invention, and is an exploded perspective drawing showing a BH housing wherein the flexible claws projecting from the installation part integrally attached to the housing body is installed by engagement with the installation hole in the backplane.
Figure 41:
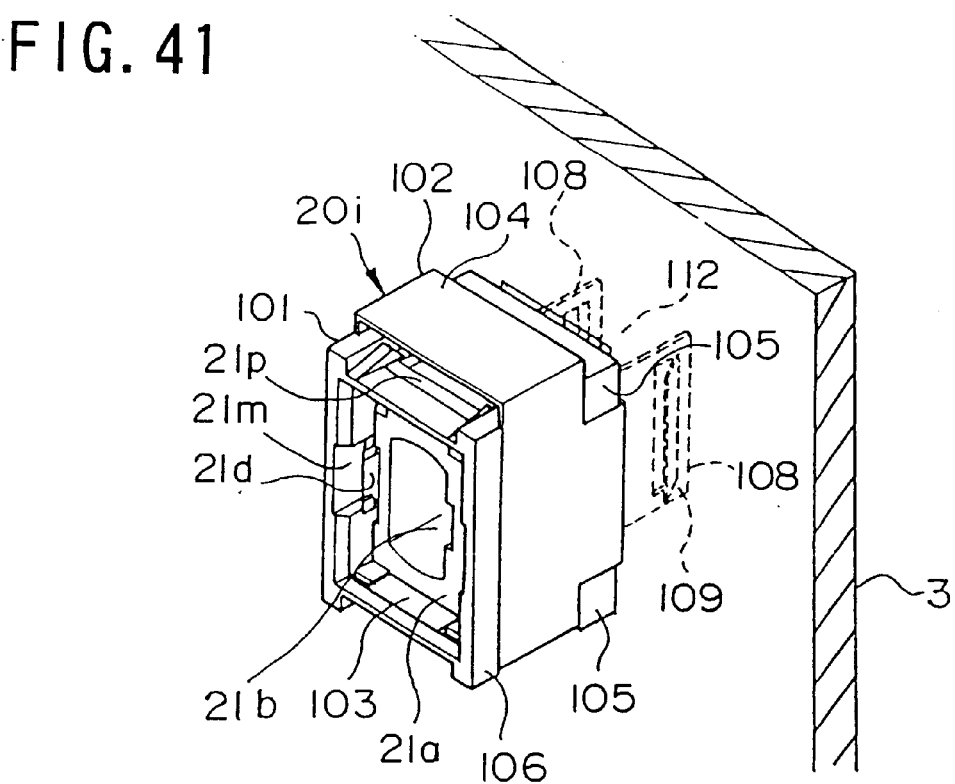
FIG. 41 is a perspective drawing showing the assembled state of the BH housing of FIG. 40.

As shown in FIG. 40 and FIG. 41, the BH housing 20i is structured to provide a housing body 101 that accommodates the inner housing 21a and an installation part 102 that is attached to the outside of this housing body 101, and is installed at the desired position by a pair of flexible claws 108 and 108 that project from the installation part 102 being engaged with the installation hole 30 (refer to FIG. 40) in the backplane 3 of the plug-in unit 1 (refer to FIG. 46).

The housing body 101 is formed in a sleeve shape from a synthetic resin such as plastic, and the accommodates the internal housing 21a in a plug accommodation hole 103 that passes through its center.

The entire installation part 102 is formed from a tensile material, and as shown in FIG. 41, a body 104 mounted and anchored to the housing body 101 from the outside is provided. As shown in FIG. 40 and FIG. 41, this body 104 has a gate shape, and by both flange parts 107 and 107 on opposite sides engaging between the projections 105 and 106 that project on the side surface of the housing body 101, it is stably anchored without misalignment on the housing body 101, and thereby this BH housing 20i is assembled.

Flexible claws 108 project from each flange part 107 and 107. An engaging claw 109 projects from the end of these flexible claws 108 and 108 that project from both flange parts 107 and 107.

Figure 42:
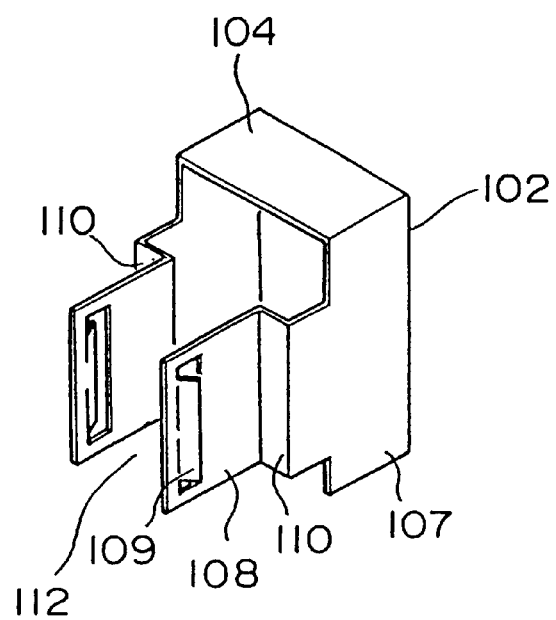
FIG. 42 is a perspective drawing showing the installation part of the BH housing of FIG. 40.

FIG. 42 is a perspective drawing viewing the installation part 102 from the side of the flexible claws 108.

In FIG. 42, the separation distance between both flexible claws 108 and 108 is smaller than the separation distance between both flange parts 107 and 107 of the body 104. The engaging claws 109 of each flexible claw 108 and 108 project from both flexible claws 108 and 108 towards the outside. A supporting wall 110 is formed between the body 104 and the flexible claws 108 and 108. This supporting wall 110 holds the backplane 3 between the engaging claws 109. The flexible claws 108 and the supporting wall 110 are made integral to the housing body 102 by anchoring the installation part 102 in the housing body 101.

Figure 43:
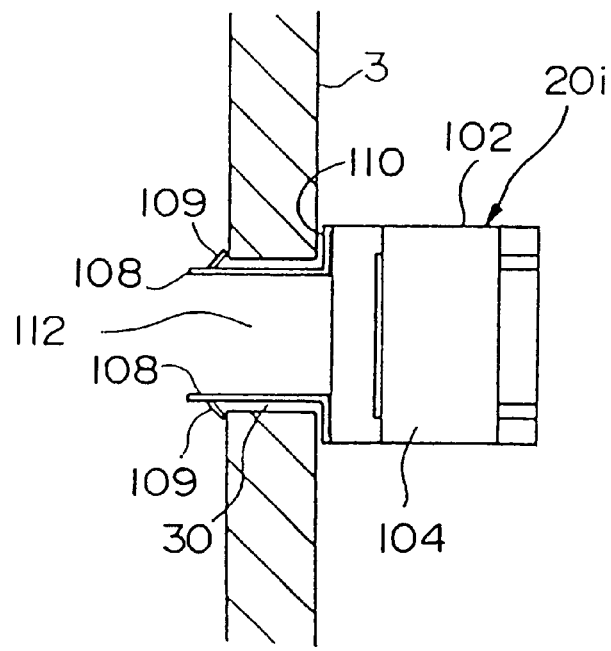
FIG. 43 is a planar drawing showing the installation state with respect to the backplane of the installation part in FIG. 42.
Figure 44:
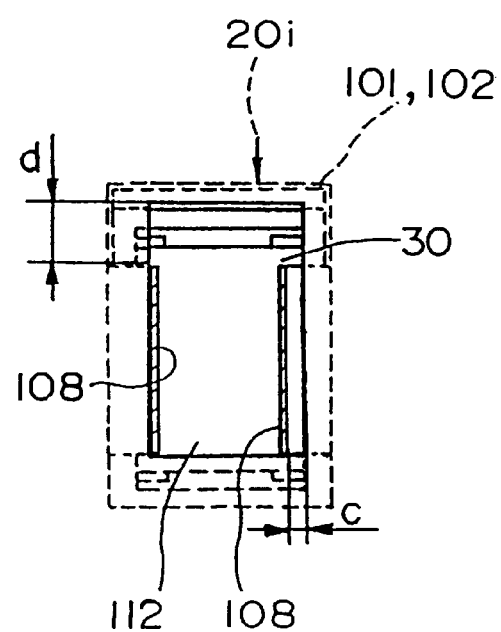
FIG. 44 is a front view showing the clearance that is guaranteed in the vicinity of the flexible claws in the installation hole in the backplane.

FIG. 43 is a planar drawing showing the BH housing 20i installed in the backplane 3, and FIG. 44 is a frontal drawing showing the installation hole 30 in the backplane 3.

As shown in FIG. 43, when both flexible claws 108 and 108 are inserted in the installation hole 30, the engaging claws 109 engage the backplane 3 on both sides of the installation hole 30, the backplane 3 is held between the engaging claws 109 and the supporting wall 110, and the BH housing 20i can be installed of the backplane 3. The holding force on the backplane 3 between the engaging claws 109 and the supporting wall 110 is an amount allowing sliding of the engaging claws 109 and the supporting wall 110 with respect to the backplane 3. In addition, between both flexible claws 108 and 108, the groove-shaped plug insertion part 112, having a size that allows passage of the MPO plug 4b inserted from outside the plug-in unit 1 (refer to FIG. 46) via the installation hole 30 (refer to FIG. 40), is secured. This plug insertion part 112 communicates with the plug installation hole 103 (refer to FIG. 40 and FIG. 41) of the housing body 101, and thus the MPO plug 4b inserted into the plug insertion part 112 from outside the backplane 3 (left side in FIG. 43) can be inserted into the plug installation hole 103.

As shown in FIG. 44, the installation hole 30 is rectangular, and has a size that guarantees the clearance in the vicinity of both inserted flexible claws 108 and 108. This clearance can be maintained, for example, in the horizontal direction (left to right in FIG. 44) at c=0.34 mm and in the vertical direction (top to bottom in FIG. 44) at d=1.60 mm. The flexible claws 108 and 108 can float within this range, and thus floating of the BH housing 20i is allowed.

When the PH housing 5 is engaged in the BH housing 20i by inserting the printed board 2 into the plug-in unit 1 (refer to FIG. 46), the MPO plug 4a on the PH housing 5 side is inserted into the intern al housing 21a within the housing body 101, and contacts the MPO plug 4b inserted into the housing body 101 via the installation hole 30. At this time, because misalignment between the PH housing 5 and the BH housing 20i is offset by the floating of the BH housing 20i, the operability of the PH housing 5 engaging in the BH housing 20i is improved.

In installing this BH housing 20i into the backplane 3, inserting the flexible claws 108 and 108 into the installation hole 30, and engaging the engaging claws 109 and 109 into the backplane 3, does not require work from both sides of the backplane 3 because it is only necessary to assemble the BH housing 20i by attaching the installation part 102 on the housing body 101, and thus the installation operability is greatly improved. In addition, because the BH housing 20i can be installed by working only on the inside of the plug-in unit 1 (refer to FIG. 46), a working space adjacent to the backplane 3 on the outside of the plug-in unit 1 is not necessary, and this is advantageous in the case of application in, for example, the wall of a building. Moreover, the internal housing 21a can be accommodated in the housing body 101 in advance.

In addition, because the clearance in the vicinity of the flexible claws 108 and 108 inserted into the installation hole 30 can be adjusted simply by adjusting the shape of the flexible claws 108 and 108, and the floating range of the BH housing 20i can be easily set, the shape of the installation hole 30 can be simple, and thus the formation operability is improved.

Furthermore, since pins are not used, the number of parts is reduced, and thus the effect of cost reduction can be attained.

Figure 45:
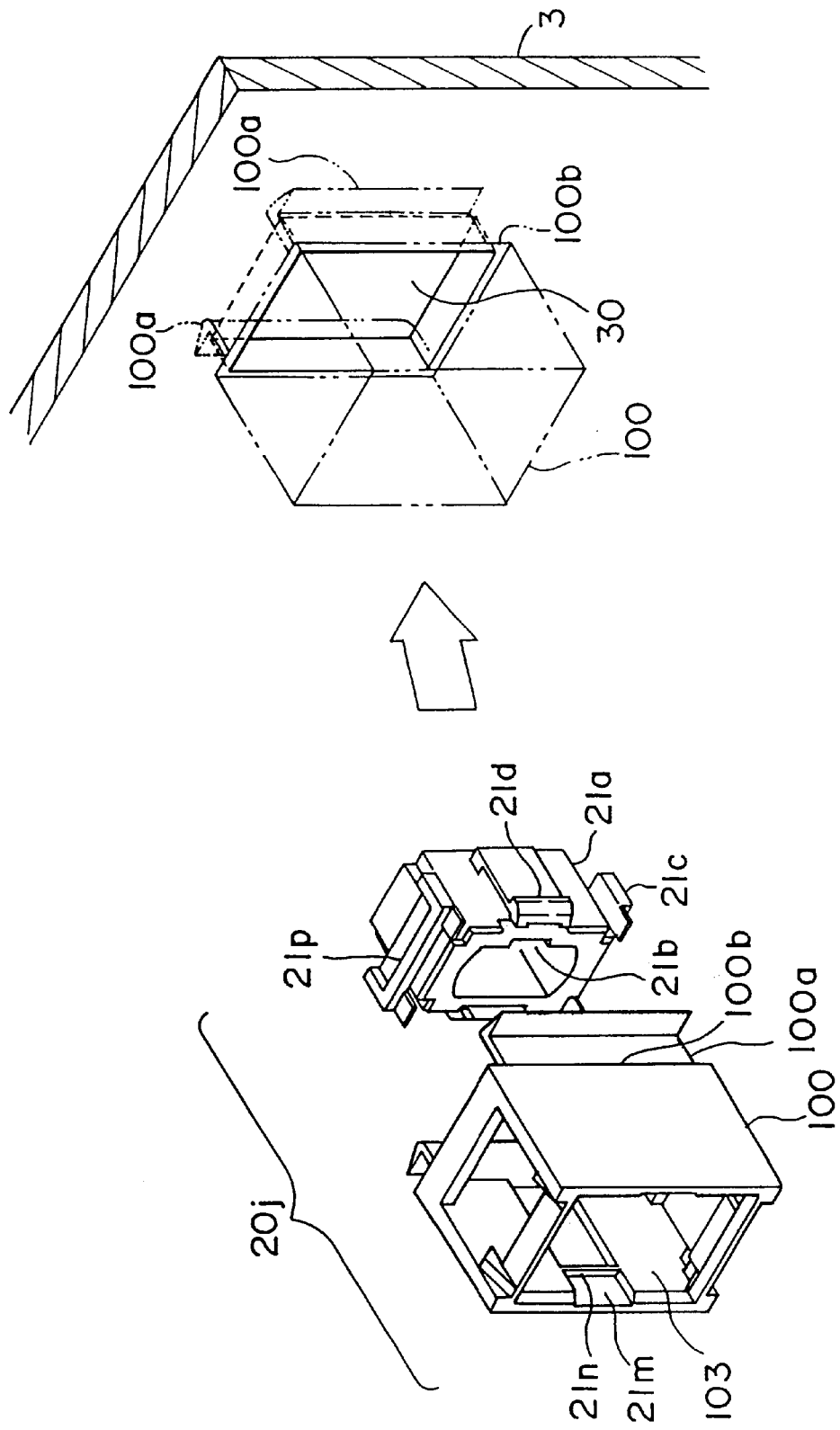
FIG. 45 is an exploded drawing showing the BH housing wherein the flexible claws projecting from the housing body are installed by insertion engagement into the installation hole in the backplane.

As shown in FIG. 45, by integrally forming the sleeve shaped housing body 100 from resin, the ends of a pair of integrally formed projecting flexible claws 110 are engaged with the backplane 3 by being inserted in the installation hole 30, and the backplane 3 is held between the ends of the flexible claws 100a and the supporting wall 100b (the ends in the axial direction of the housing body 100), and thereby a structure for installation at the desired position on the backplane 3 can be used. Here, the housing body 100 that accommodates the internal housing 21a itself forms the BH housing 20j. In this optical connector as well, due to the clearance secured in the vicinity of the pair of flexible claws 100a inserted in the insertion hole 30, naturally the floating range of the BH housing 20j is guaranteed. Because the optical connector having this structure does not need an installation part, there are the advantages that, for example, the cost can be lowered, and the assembly time can be reduced.

Moreover, the present invention is not limited to any of the above-described embodiments, and for example, the shapes, materials, etc., of the housing body, the internal housing, the PH housing, the fixed part, the installation part, etc., can be altered as appropriate.

Optical fibers connected by the optical connector according to the present invention are mainly single mode, but it can be adapted to multi-mode optical fibers. In addition, this optical connector can be applied to single core, four cores, 8 cores, etc., or any number of cores.

Considering anti-corrosiveness and flexibility, stainless steel, for example, could also be used as a material for the fixed part.

A PPS (polyphenylenesulfide) resin, for example, can be advantageously used as a material for the housings (BH housing, PH housing, internal housing) that form the optical connector.

Up until this point, the structure of an optical connector providing a BH connector having a structure wherein the MPO plugs 4a and 4b are positioned so as to be connectable by abutment using an internal housing accommodated inside a housing body, but the optical connector of the present invention is not limited thereto, and for example, a structure wherein an MPO plugs 4a and 4b that are directly positioned by a housing body that does not provide an internal housing can be used. In this case, a structure wherein the housing body of the BH housing functions as an adapter that positions the MP plugs inserted from both sides can be used.

What is claimed is:

1. An optical connector having a housing body and a fixed part disposed opposite each other on the front and back sides of a backplane and installed so as to hold said backplane therebetween, and connecting an optical connector plug inserted into said housing body via an installation hole in said backplane of another optical connector plug inserted into said housing body from the direction opposite to that of said optical connector plug, wherein:

said fixed part provides a plug insertion hole into which said optical connector plug is inserted and flexible claws that are positioned on opposite sides of said plug insertion hole and engage by being inserted into said housing body; and further wherein:

said flexible claws engage said housing body via said installation hole of said backplane, and thereby said housing body and said fixed part are installed so as to hold said backplane, and said plug insertion hole communicates with said installation hole and said housing body.

2. An optical connector according to claim 1 characterized in maintaining a clearance in the vicinity of said flexible claws inserted into said installation hole and allowing displacement of said flexible claws within said installation hole.

3. An optical connector according to claim 1, wherein a pair of second flexible claws integrally provided on said housing body pass through said installation hole and engage with said backplane on both sides of said installation hole, and said backplane is held between this pair of second flexible claws and bearing walls integrally provided on said housing body, and thereby said housing body is supported at a desired position on said backplane.

4. An optical connector according to claim 3, wherein said pair of second flexible claws project from an installation part mounted and anchored on the outside of said housing body, these second flexible claws pass through said installation hole and engage with the backplane on both sides of said installation hole, and said backplane is held between this pair of second flexible claws and bearing walls integrally provided on said installation part, and thereby said housing body is supported at a desired position on said backplane.

5. An optical connector according to claim 4, wherein said installation part provides:

a plug insertion part into which said optical connector plug can be inserted;

said bearing walls disposed on opposite sides of said plug insertion part, and a pair of third flexible claws that project from each of said bearing walls and engage the backplane on both sides of said installation hole by insertion into said installation hole; and wherein:

said optical connector plugs that can be inserted into said housing body via said installation hole and said plug insertion part when said housing body is supported at a desired position in the backplane by said installation part installed in the backplane.

6. An optical connector according to claim 4, wherein said installation part is mounted on said housing body by a pair of flange parts that project from said installation part externally engaging said housing body.

* * * * *